US008547431B2

(12) United States Patent
Williams et al.

(10) Patent No.: US 8,547,431 B2
(45) Date of Patent: Oct. 1, 2013

(54) METHOD AND APPARATUS FOR GENERATING AN EVENT LOG

(75) Inventors: Michael John Williams, Winchester (GB); Christopher Leonard Robinson, Guildford (GB)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 12/480,260

(22) Filed: Jun. 8, 2009

(65) Prior Publication Data
US 2010/0026801 A1    Feb. 4, 2010

(30) Foreign Application Priority Data

Aug. 1, 2008  (GB) .................................. 0814139.2

(51) Int. Cl.
*H04N 7/18* (2006.01)
*H04N 5/225* (2006.01)
*G06K 9/00* (2006.01)

(52) U.S. Cl.
USPC ............................ 348/135; 348/169; 382/103

(58) Field of Classification Search
None
See application file for complete search history.

(56) References Cited

U.S. PATENT DOCUMENTS

| | | | |
|---|---|---|---|
| 5,563,988 A | 10/1996 | Maes et al. | |
| 5,923,365 A * | 7/1999 | Tamir et al. | 348/169 |
| 6,441,825 B1 | 8/2002 | Peters | |
| 6,441,846 B1 * | 8/2002 | Carlbom et al. | 348/169 |
| 7,483,049 B2 * | 1/2009 | Aman et al. | 348/162 |
| 7,646,914 B2 * | 1/2010 | Clausi et al. | 382/187 |
| 2003/0020718 A1 | 1/2003 | Marshall et al. | |
| 2004/0056879 A1 * | 3/2004 | Erdelyi | 345/716 |
| 2009/0041298 A1 * | 2/2009 | Sandler et al. | 382/103 |

FOREIGN PATENT DOCUMENTS

| | | |
|---|---|---|
| CN | 1640519 A | 7/2005 |
| CN | 1764931 A | 4/2006 |
| EP | 1 164 542 A1 | 12/2001 |
| ES | 2 165 783 | 3/2002 |
| JP | 2006-12012 | 1/2006 |
| JP | 2006-251885 | 9/2006 |
| WO | WO 02/056254 A2 | 7/2002 |
| WO | WO 02/056254 A3 | 7/2002 |
| WO | WO 02/071334 | 9/2002 |

OTHER PUBLICATIONS

Masato Kurokawa, et al., "Representation and Retrieval of Video Scene by Using Object Actions and Their Spatio-Temporal Relationships", IEEE, vol. 2, Oct. 24, 1999, pp. 86-90, XP010369097.

(Continued)

*Primary Examiner* — Wen-Tai Lin
(74) *Attorney, Agent, or Firm* — Oblon, Spivak, McClelland, Maier & Neustadt, L.L.P.

(57) ABSTRACT

A method of generating an event log of game events associated with elements in a sporting event. The method includes tracking, within a sequence of video images, image features which correspond to respective elements in the sporting event and selecting, from the tracked image features, a first image feature which corresponds to one of the elements so as to designate that element as a selected element. The method further includes selecting a game event from an event list of possible game events for association with the selected element, and associating the selected game event with the selected element so as to generate the event log.

20 Claims, 19 Drawing Sheets

(56) References Cited

OTHER PUBLICATIONS

Xinguo Yu, et al "A Player-Possession Acquisition System for Broadcast Soccer Video", IEEE, XP010842087, Jul. 6, 2005, pp. 522-525.
Xinguo Yu, et al., "Trajectory-Based Ball Detection and Tracking with Applications to Semantic Analysis of Broadcast Soccer Video", Proceedings of the 11th ACM International Conference on Multimedia, XP040171502, Dec. 31, 2003, pp. 11-20.
Yongjun Liao, et al., "A Novel Rule-based Soccer Annotation System", SPIE, vol. 4875, XP-002554343, 2002, pp. 881-887.
Yongjun Liao, et al., "A Novel Rule-based Soccer Annotation System", SPIE, vol. 4875, XP-002554344, 2002, pp. 881-887.
Russian Office Action dated Feb. 7, 2013, along with its English Translation, in Russian Application No. 2009129556.
English tranalation of Japanese Office Action dated Mar. 5, 2013, in Japanese Patent Application No. 2009-179717.

* cited by examiner

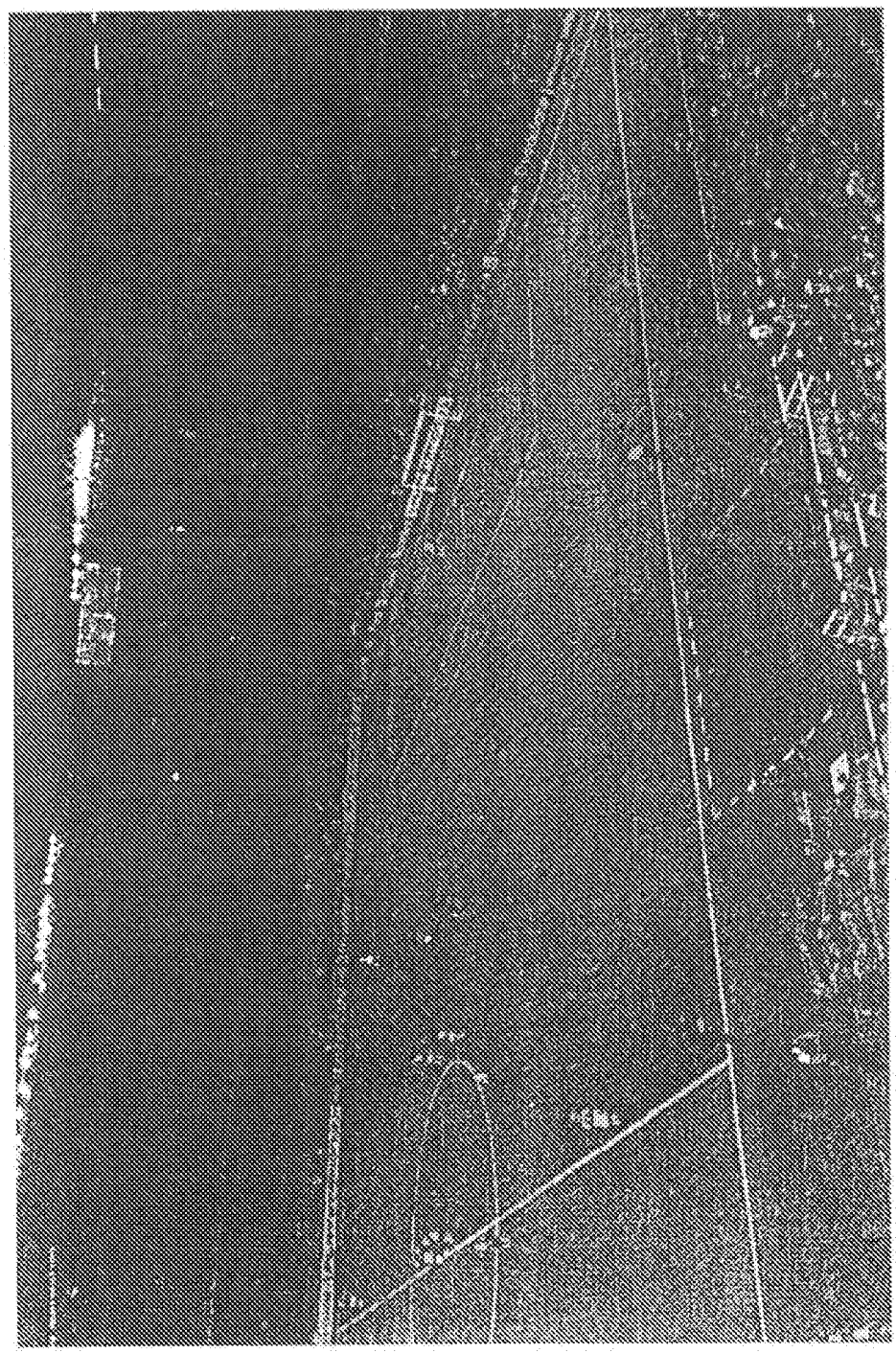

METHOD AND APPARATUS FOR GENERATING AN EVENT LOG

BACKGROUND OF THE INVENTION

1. Field of the Invention

The present invention relates to a method and apparatus for generating an event log.

2. Description of the Prior Art

In the field of sports broadcasting such as coverage of football matches, it is usual for commentators to identify visually players from live video footage of a match or from a vantage point in a stadium so that match statistics may be compiled about each player. Additionally, for highlights programs, information about a position of each player on a field of play and their actions on the field of play may be compiled by an operator from the recording of the live video footage using a suitable review and editing suite.

However, reviewing and editing the recorded video footage is time consuming and expensive as well as being subject to human error. Although, automated systems can be used to assist the human operator to track each player using image recognition techniques carried out on the video footage of the match, automated systems may struggle to log an event if a player is involved in a game event such as kicking a ball, tackling another player and the like.

Furthermore, annotated data regarding the position of players during a game may be used to recreate that match using a 3D virtual simulation. However, in order for the simulation to look realistic, data relating to the type of game event needs to be input to apparatus performing the simulation so that simulated players can be caused to perform suitable game actions in accordance with real events during the match.

Some systems such as that described in WO-A-02/071334 use multiple cameras to track participants in a sporting event such as a football match. Position data generated by the system may be annotated with an appropriate game by an operator using a separate list which is displayed separately from footage of the match.

However, where there are many events involved, it can be time consuming for an operator to annotate large amounts of footage due to having to select a player from the list, and confirming visually from the footage which event should be associated with the player.

The present invention seeks to alleviate or mitigate the above problems.

SUMMARY OF THE INVENTION

In a first aspect, there is provided a method of generating an event log of game events associated with an element present in a sporting event, the method comprising:

tracking, within a sequence of video images, image features which correspond to respective elements in the sporting event;

selecting, from the tracked image features, a first image feature which corresponds to one of the elements so as to designate that element as a selected element;

selecting a game event from an event list of possible game events for association with the selected element; and associating the selected game event with the selected element so as to generate the event log for that element.

Accordingly, by tracking image features corresponding to, for example, players of a football game, and selecting an image feature corresponding to a desired player, an operator may select an appropriate game event (such as a kick or a header) from an event list to associate with that player. Additionally, an image feature corresponding to a player may be automatically selected by, for example, a content processing workstation and an appropriate event from the event list associated with that player. Therefore, costs and labour involved in marking up video footage to generate match statistics can be reduced. Furthermore, for example, the resultant event log may be used as an input to a 3D simulation comprising tracking data of players and a ball involved in a real football match thus improving the 3D simulation of the real match; a simulated player can thus be caused to mimic the actions associated with the game event.

This method also comprises displaying, within the sequence of video images, the first image feature together with the event list; and selecting the game event from the event list in accordance with a manual selection of the game event by a user.

This assists the user in choosing the event and so speeds up the annotation process.

The event list may displayed to be substantially adjacent to the first image feature.

This allows the user to concentrate on the area of the screen where the video is displayed. This again quickens the annotation process.

The method may also comprise tracking, by analysis of the sequence of video images, a position within each video image of a game object associated with the sporting event so as to generate motion data which relates to a direction of motion of the game object within the sequence of video images;

detecting an occurrence of a game event in dependence upon a change in the direction of motion of the game object by analysing the motion data; and flagging one or more video images in which a game event is detected to have occurred so as to indicate that those video images comprise an occurrence of a game event.

By doing this, it is possible to automatically detect where there is an event allowing the user to skip to relevant frames more quickly.

A game event may be detected to have occurred if the change in the direction of motion of the game object is greater than a predetermined threshold.

The method may comprise detecting, by analysis of the sequence of video images, a position of the game object with respect to the selected element; and selecting a game event from the event list in accordance with the detected position of the game object with respect to the selected element.

This is particularly useful in helping select relevant events. For example, in the soccer embodiment described hereinafter, it may be that knowing that an event took place when the game object (for instance, ball) is about head height means that the event is likely to be that the ball is headed.

The method may comprise detecting a relative distance between the game object and each of the elements so as to generate distance data which relates to the distance between the game object and each of the elements;

analysing the distance data so as to detect which of the elements was closest to the game object when a game event is detected to have occurred; and associating that game event with the element that is detected as being closest to the game object when the game event occurred.

This again may help in automating the event logging.

The method may also comprise sequentially displaying the sequence of video images; pausing the sequential display of the sequence of video images at a video image which has been flagged as comprising an occurrence of a game event; and displaying the first image feature together with the event list so that an appropriate game event may be selected by a user from the event list for association with the selected element.

This again may help with speeding up the event logging process.

Each element may be associated with unique identifying data which allows that element to be uniquely identified.

A computer program containing computer readable instructions which, when loaded onto a computer, configure the computer to perform the method is also provided.

In another aspect there is provided an apparatus for generating an event log of game events associated with an element in a sporting event, the apparatus comprising:

tracking means for tracking, within a sequence of video images, image features which correspond to respective elements in the sporting event;

image feature selection means for selecting, from the tracked image features, a first image feature which corresponds to one of the elements so as to designate that element as a selected element;

game event selection means for selecting a game event from an event list of possible game events for association with the selected element; and associating means for associating the selected game event with the selected element so as to generate the event log for that element.

This apparatus also comprises means for displaying, within the sequence of video images, the first image feature together with the event list; and in which the game event selection means is operable to select the game event from the event list in accordance with a manual selection of the game event by a user.

In yet a further aspect, there is provided an apparatus for generating an event log of game events associated with an element in a sporting event, the apparatus comprising:

a tracking device for tracking, within a sequence of video images, image features which correspond to respective elements in the sporting event;

an image feature selector for selecting, from the tracked image features, a first image feature which corresponds to one of the elements so as to designate that element as a selected element;

a game event selector for selecting a game event from an event list of possible game events for association with the selected element; and an association device for associating the selected game event with the selected element so as to generate the event log for that element.

This apparatus also comprises a displaying device for displaying, within the sequence of video images, the first image feature together with the event list; and in which the game event selector is operable to select the game event from the event list in accordance with a manual selection of the game event by a user.

The event list may be displayed to be substantially adjacent to the first image feature.

The tracking device may be operable to track, by analysis of the sequence of video images, a position within each video image of a game object associated with the sporting event so as to generate motion data which relates to a direction of motion of the game object within the sequence of video images; and the apparatus may further comprise:

a detector for detecting an occurrence of a game event in dependence upon a change in the direction of motion of the game object by analysing the motion data; and a flagging device for flagging one or more video images in which a game event is detected to have occurred so as to indicate that those video images comprise an occurrence of a game event.

A game event may be detected to have occurred if the change in the direction of motion of the game object is greater than a predetermined threshold.

The tracking device may be operable to detect, by analysis of the sequence of video images, a position of the game object with respect to the selected element; and the game event selector may be operable to select a game event from the event list in accordance with the detected position of the game object with respect to the selected element.

The tracking device may be operable to: detect a relative distance between the game object and each of the elements so as to generate distance data which relates to the distance between the game object and each of the elements; and analyse the distance data so as to detect which of the elements was closest to the game object when a game event is detected to have occurred; and the association device may be operable to associate that game event with the element that is detected as being closest to the game object when the game event occurred.

The apparatus may comprise a displaying device for sequentially displaying the sequence of video images;

in which the apparatus is configured to:

pause the sequential display of the sequence of video images at a video image which has been flagged as comprising an occurrence of a game event; and cause the displaying device to display the first image feature together with the event list so that an appropriate game event may be selected by a user from the event list for association with the selected element.

Each element may be associated with unique identifying data which allows that element to be uniquely identified.

In a further aspect there is provided a graphical user interface for generating an event log of game events associated with elements in a sporting event, the event being subsequently associated with the element, the interface comprising:

image features, within one frame of a sequence of frames, which correspond to respective elements in the sporting event;

an image feature selector for selecting, from the displayed image features, a first image feature which corresponds to one of the elements so as to designate that element as a selected element;

a game event selector for selecting a game event from an event list of possible game events for association with the selected element;

a displaying device for displaying, within the sequence of video images, the first image feature together with the event list; and in which the game event selector is operable to select the game event from the event list in accordance with a manual selection of the game event by a user.

Various further aspects and features of the present invention are defined in the appended claims.

BRIEF DESCRIPTION OF DRAWINGS

The above and other advantages and features of the invention will be apparent from the following detailed description of illustrative embodiments which is to be read in connection with the accompanying drawings, in which:

FIG. 4A is an illustration of a video image captured from a scene, which shows a football match with players to be tracked;

DESCRIPTION OF EXAMPLE EMBODIMENTS

A method and apparatus for generating an event log is disclosed. In the following description, a number of specific details are presented in order to provide a thorough understanding of embodiments of the present invention. It will be apparent however to a person skilled in the art that these specific details need not be employed to practice the present invention. Conversely, specific details known to the person skilled in the art are omitted for the purposes of clarity in presenting the embodiments.

Figure 1:
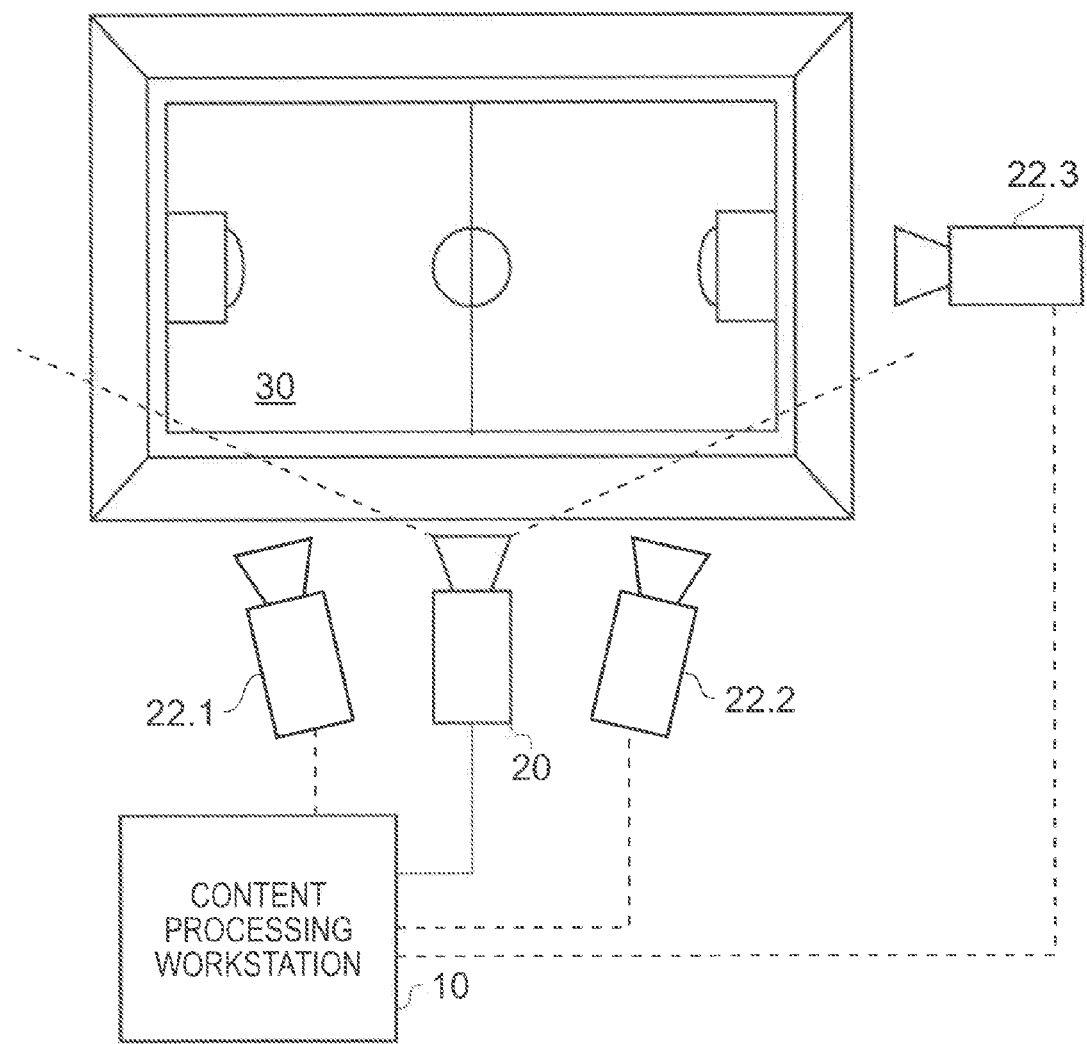
FIG. 1 is a schematic diagram of an object tracking system used in the event logging apparatus and method in accordance with an embodiment of the present invention.

FIG. 1 shows a schematic diagram of an object tracking system used in the event logging apparatus and method in accordance with embodiments of the present invention. In the embodiment shown in FIG. 1, the objects to be tracked are football players (not shown) on a football pitch 30. High definition (HD) video images (1920 by 1080 pixels) of the pitch 30 are captured by one or more high definition cameras. Although, embodiments of the present invention can be used to track objects in video images from more than one camera, in some examples only a single camera is used. As will be appreciated, HD cameras are expensive, so that using only a single camera can reduce an amount of expense required to implement systems which utilise the present technique. However, using only a single camera provides only a single two dimensional view of a scene within which the objects are disposed. As a result tracking of the objects within the scene represented by the video images can be more difficult, because occlusion events, in which one object obscures another, are more likely. Such a single camera 20 example is shown in FIG. 1, although as illustrated by camera 22.1, 22.2 optionally two cameras can be used, each pointing at a different half of the football pitch.

In some embodiments, a further camera 22.3 may be used in combination with the camera 20 and/or the cameras 22.1 and 22.2 so as to detect a position of an object such as a football with respect to the football pitch 30. This will be described in more detail later below.

In FIG. 1, a video camera 20 is disposed at a fixed point within the football stadium and arranged to communicate signals representing video images captured by the camera 20 to a content processing workstation 10, which carries out image processing and other operations so as to track the position of the players on the pitch with respect to time. Data representing the position of the players with respect to time is then logged so that metadata and match statistics can be generated such as the length of time a particular player spent in a particular part of the pitch, how far each player ran and the like. The data representing the position of the players with respect to time forms path data for each player, which relates to the path that each player has taken within the video images. The path data is generated with respect to a three dimensional model of the football pitch (object plane) in order to provide information associated with movement of the players with respect to their position on the pitch, which is not readily apparent from the (two dimensional) video images. This generated path data can then be used to enhance a viewing experience for a viewer when footage of the football match is transmitted via a suitable medium to the viewer or to assist a coach when coaching the football team. The tracking of objects such as players on the pitch 30 will be described in more detail below.

In embodiments of the present invention, the content processing workstation 10 uses a Cell processor jointly developed by Sony®, Toshiba® and IBM®. The parallel nature of the Cell processor makes it particularly suitable for carrying out computationally intensive processing tasks such as image processing, image recognition and object tracking. However, a skilled person will appreciate that any suitable workstation and processing unit may be used to implement embodiments of the present invention.

According to the present technique, the video images, which are generated using the HD video camera 20 are arranged to capture the view of the whole pitch, so that the players on the pitch can be tracked. Thus the whole pitch is captured from a static position of the camera 20, although as mentioned above, more than one camera could be used, in order to capture the whole pitch. In one example, as mentioned above, the two cameras 22.1, 22.2 may be used each of which is directed at different halves of the pitch. In this example, the video images generated by each camera may be stitched together by the content processing workstation 10 as described in United Kingdom Patent Application No. 0624410.7 (published as GB-A-2 444 566) so as to form ultra high resolution video images. In this, after undergoing the stitching process, the output from the camera cluster can be thought of as a single ultra-high resolution image.

The advantages of the ultra-high definition arrangement are numerous including the ability to highlight particular features of a player without having to optically zoom and therefore affecting the overall image of the stadium. Furthermore, the automatic tracking of an object is facilitated because the background of the event is static and there is a higher screen resolution of the object to be tracked.

Object tracking used in the event logging apparatus and method in accordance with embodiments of the present invention will now be described with reference to FIGS. 2, 3 and 4.

Figure 2:
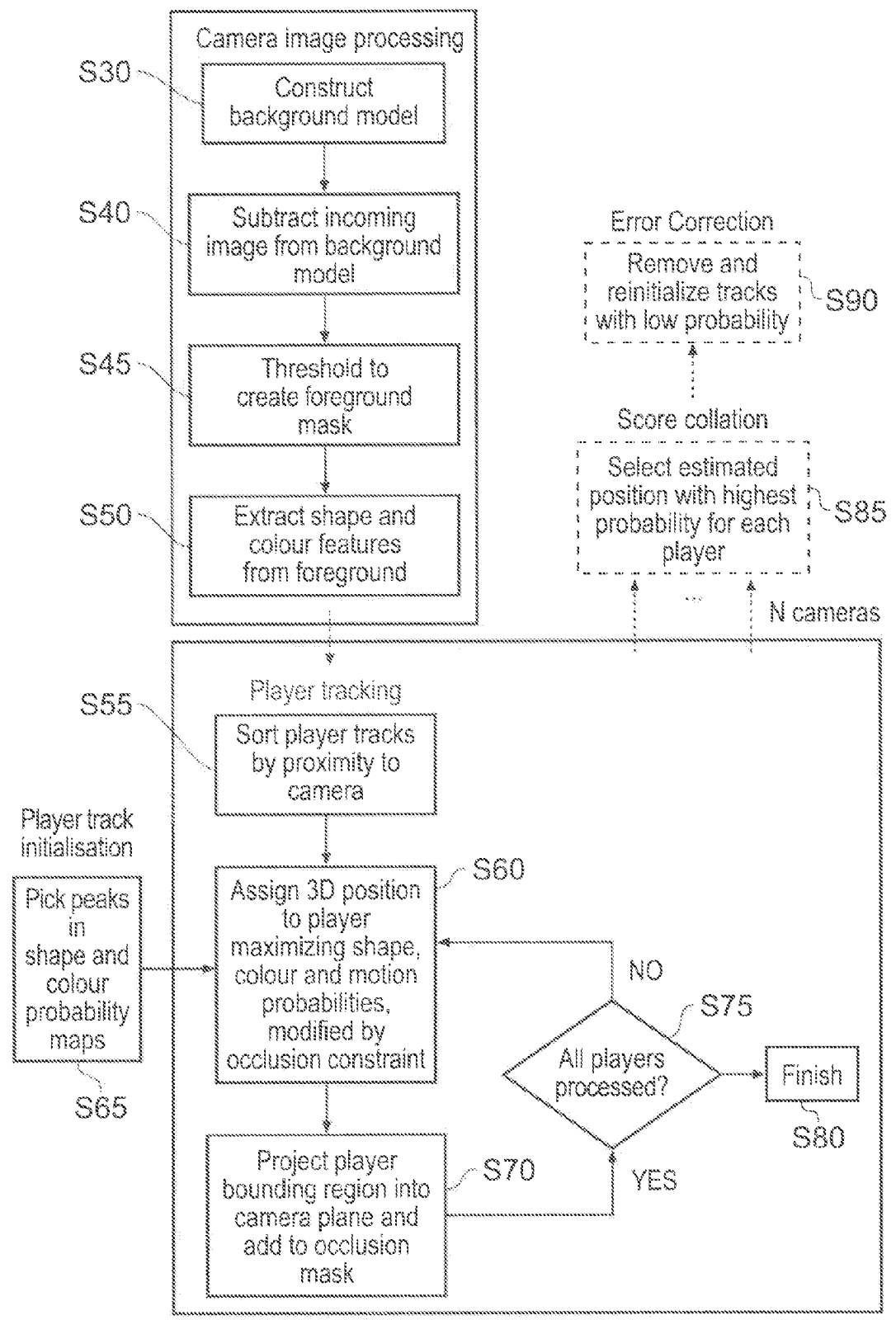
FIG. 2 is a flow diagram of a method of object tracking used in the event logging apparatus and method in accordance with embodiments of the present invention.

FIG. 2 shows a flowchart of a method of object tracking. In order to track an object, a background model is constructed from those parts of the received video that are detected as being substantially static over a predetermined number of frames. In a first step S30 the video image received from the camera 20, which represents the football pitch is processed to construct the background model of the image. The background model is constructed in order to create a foreground mask which assists in identifying and tracking the individual players. The background model is formed at step S30 by determining for each pixel a mean of the pixels and a variance of the pixel values between successive frames in order to build the background model. Thus, in successive frames where the mean value of the pixels do not change greatly then these pixels can be identified as background pixels in order to identify the foreground mask.

Such a background/foreground segmentation is a process which is known in the field of image processing and the present technique utilises an algorithm described in document by Manzanera and Richefeu, and entitled "A robust and Computationally Efficient Motion Detection Algorithm Based on $\Sigma$-$\Delta$ Background Estimation", published in proceedings ICVGIP, 2004. However, the present technique should not be taken as being limited to this known technique and other techniques for generating a foreground mask with respect to a background model for use in tracking are also known.

It will be appreciated that, in the case where the field of view of the video camera encompasses some of the crowd, the crowd is unlikely to be included in the background model as they will probably be moving around. This is undesirable because it is likely to increase a processing load on the Cell processor when carrying out the object tracking as well as being unnecessary as most sports broadcasters are unlikely to be interested in tracking people in the crowd.

In the object tracking technique disclosed, the background model is constructed at the start of the game and can even be done before players come onto the pitch. Additionally, the background model can be recalculated periodically throughout the game so as to take account of any changes in lighting condition such as shadows that may vary throughout the game.

In step S40, the background model is subtracted from the incoming image from the camera to identify areas of difference. Thus the background model is subtracted from the image and the resultant image is used to generate a mask for each player. In step S45, a threshold is created with respect to the pixel values in a version of the image which results when the background model has been subtracted. The background model is generated by first determining the mean of the pixels over a series of frames of the video images. From the mean values of each of the pixels, the variance of each of the pixels can be calculated from the frames of the video images. The variance of the pixels is then used to determine a threshold value, which will vary for each pixel across all pixels of the video images. For pixels, which correspond to parts of the image, where the variance is high, such as parts which include the crowd, the threshold can be set to a high value, whereas the parts of the image, which correspond to the pitch will have a lower threshold, since the colour and content of the pitch will be consistently the same, apart from the presence of the players. Thus, the threshold will determine whether or not a foreground element is present and therefore a foreground mask can correspondingly be identified. In step S50 a shape probability based on a correlation with a mean human shape model is used to extract a shape within the foreground mask. Furthermore, colour features are extracted from the image in order to create a colour probability mask, in order to identify the player, for example from the colour of the player's shirt. Thus the colour of each team's shirts can be used to differentiate the players from each other. To this end, the content processing workstation 10 generates colour templates in dependence upon the known colours of each football team's team kit. Thus, the colour of the shirts of each team is required, the colour of the goal keeper's shirts and that of the referee. However, it will be appreciated that other suitable colour templates and/or template matching processes could be used.

Returning to FIG. 2, in step S50 the content processing workstation 10 compares each of the pixels of each colour template with the pixels corresponding to the shirt region of the image of the player. The content processing workstation then generates a probability value that indicates a similarity between pixels of the colour template and the selected pixels, to form a colour probability based on distance in hue saturation value (HSV) colour space from team and pitch colour models. In addition, a shape probability is used to localise the players, which is based on correlation with a mean human shape model, Furthermore, a motion probability is based on distance from position predicted by a recursive least-squares estimator using starting position, velocity and acceleration parameters.

Figure 3A:
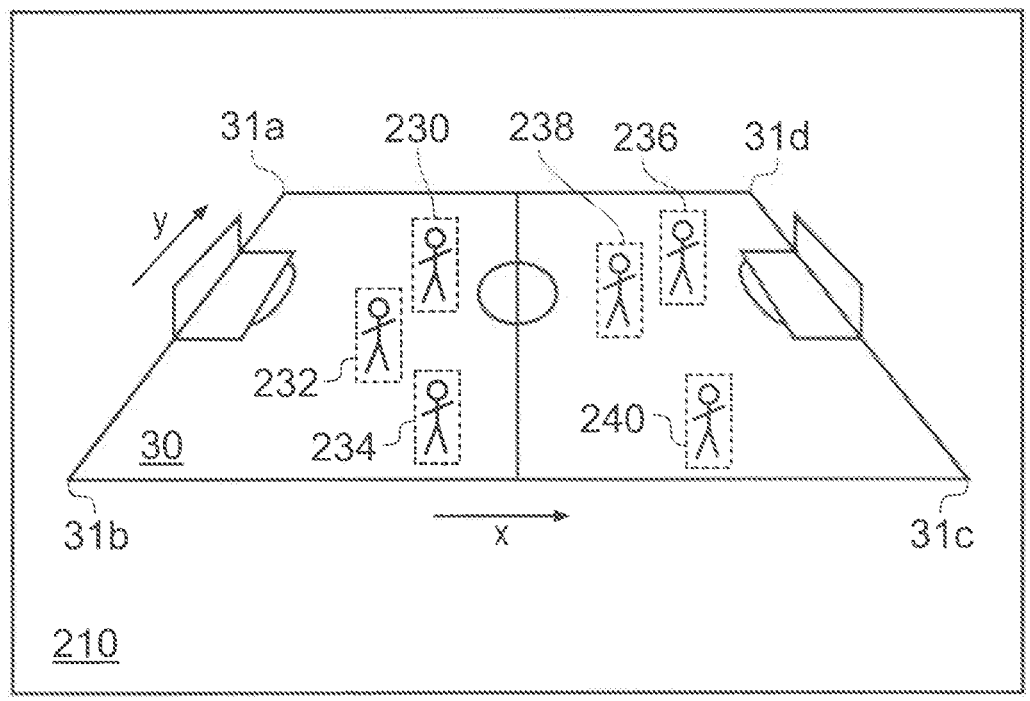
FIGS. 3A and 3B are schematic diagrams of object tracking used in the event logging apparatus and method in accordance with an embodiment of the present invention.

The creation of player masks is illustrated in FIG. 3A. FIG. 3A shows a camera view 210 of the football pitch 30 generated by the video camera 20. As already explained, the pitch 30 forms part of the background model, whilst the players 230, 232, 234, 236, 238, 240 should form part of the foreground mask as described above. Player bounding boxes are shown as the dotted lines around each player.

Thus far the steps S30, S40, S45 and S50 are performed with a respect to the camera image processing. Having devised the foreground mask, player tracking is performed after first sorting the player tracks by proximity to the camera in step S55. Thus, the players which are identified as being closest to the camera are processed first in order to eliminate these players from the tracking process. At step S60, player positions are updated so as to maximise shape, colour and motion probabilities. In step S70 an occlusion mask is constructed that excludes image regions already known to be covered by other closer player tracks. This ensures that players partially or wholly occluded by other players can only be matched to visible image regions. The occlusion mask improves tracking reliability as it reduces the incidence of track merging (whereby two tracks follow the same player after an occlusion event). This is a particular problem when many of the targets look the same, because they cannot be (easily) distinguished by colour. The occlusion mask allows pixels to be assigned to a near player and excluded from the further player, preventing both tracks from matching to the same set of pixels and thus maintaining their separate identities.

Figure 3B:
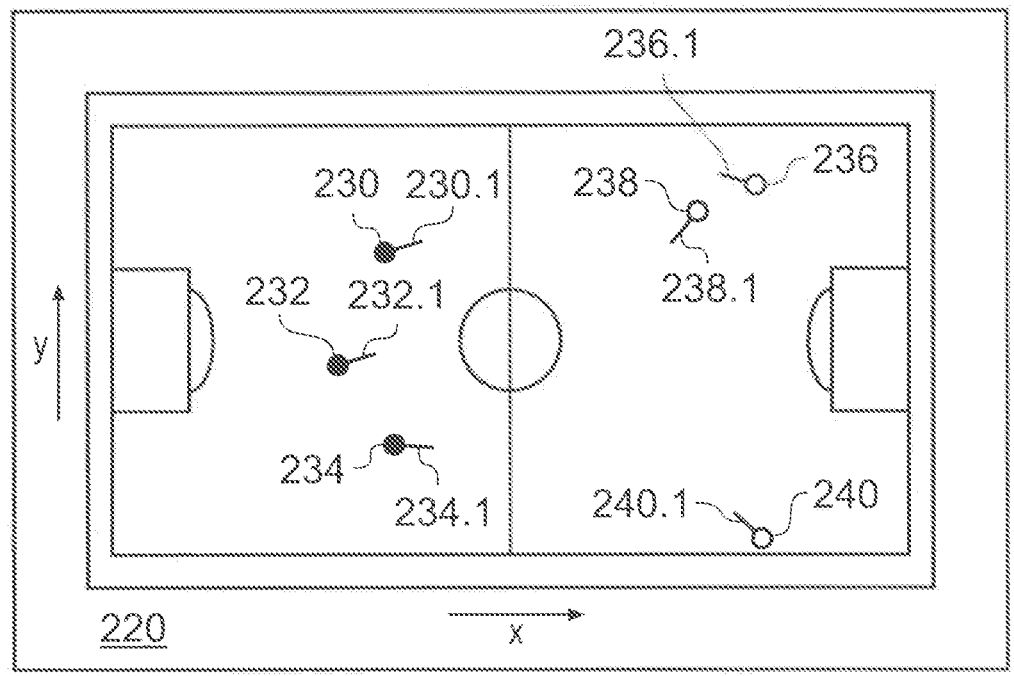

There then follows a process of tracking each player by extracting the features provided within the camera image and mapping these onto a 3D model as shown in FIGS. 3A and 3B. Thus, for corresponding a position within the 2D image produced by the camera, a 3D position is assigned to a player which maximises shape, colour and motion probabilities. As will be explained shortly, the selection and mapping of the player from the 2D image onto the 3D model will be modified should an occlusion event have been detected. To assist the mapping from the 2D image to the 3D model in step S65 the players to be tracked are initialised to the effect that peaks in shape and colour probability are mapped onto the most appropriate selection of players. It should be emphasised that the initialisation, which is performed at step S65 is only performed once, typically at the start of the tracking process. For a good initialisation of the system, the players should be well separated. After initialisation any errors in the tracking of the players are corrected automatically in accordance with the present technique, which does not require manual intervention.

In order to effect tracking in the 3D model from the 2D image positions, a transformation is effected by use of a projection matrix P. Tracking requires that 2D image positions can be related to positions within the 3D model. This transformation is accomplished by use of a projection (P) matrix. A point in 2D space equates to a line in 3D space:

$$\begin{bmatrix} x \\ y \\ 1 \end{bmatrix} = \begin{bmatrix} P_{00} & P_{01} & P_{02} & P_{03} \\ P_{10} & P_{11} & P_{12} & P_{13} \\ P_{20} & P_{21} & P_{22} & P_{23} \\ 0 & 0 & 0 & 1 \end{bmatrix} \begin{bmatrix} x' \\ y' \\ z' \\ w \end{bmatrix}$$

A point in a 2D space equates to a line in a 3D space because a third dimension, which is distance from the camera, is not known and therefore would appear correspondingly as a line across the 3D model. A height of the objects (players) can be used to determined the distance from the camera. A point in 3D space is gained by selecting a point along the line that lies at a fixed height above the known ground level (the mean human height). The projection matrix P is obtained a priori, once per camera before the match by a camera calibration process in which physical characteristics of the pitch such as the corners 31A, 31B, 31C, 31D of the pitch 30 are used to determine the camera parameters, which can therefore assist in mapping the 2D position of the players which have been identified onto the 3D model. This is a known technique, using established methods. In terms of physical parameters, the projection matrix P incorporates the camera's zoom level, focal centre, 3D position and 3D rotation vector (where it is pointing).

The tracking algorithm performed in step S60 is scalable and can operate on one or more cameras, requiring only that all points on the pitch are visible from at least one camera (at a sufficient resolution).

In addition to the colour and shape matching, step S60 includes a process in which the motion of the player being tracked is also included in order to correctly identified each of the players with a greater probability. Thus the relevant movement of players between frames can be determined both in terms of a relevant movement and in a direction. Thus, the relative motion can be used for subsequent frames to produce a search region to identify a particular player. Furthermore, as illustrated in FIG. 3B, the 3D model of the football pitch can be augmented with lines to 30.1, to 32.1, to 34.1, to 36.1, to 38.1, 240.1 which are positioned relative to the graphic indication of the position of the players to reflect the relative direction of motion of the players on the football pitch.

At step S70, once the relative position of the players has been identified in the 3D model then this position is correspondingly projected back into the 2D image view of the football pitch and a relative bound is projected around the player identified from its position in the 3D model. Also at step S70, the relative bound around the player is then added to the occlusion mask for that player.

FIG. 3B shows a plan view of a virtual model 220 of the football pitch. In the technique shown in FIG. 3B, the players 230, 232, and 234 (on the left hand side of the pitch) have been identified by the content processing workstation 10 as wearing a different coloured football shirt from the players 236, 238, and 240 (on the right hand side of the pitch) thus indicating that they are on different teams. Differentiating the players in this way makes the detection of each player after an occlusion event easier as they can easily be distinguished from each other by the colour of their clothes.

Referring back to FIG. 2, at a step S60, the position of each player is tracked using known techniques such as Kalman filtering although it will be appreciated that other suitable techniques may be used. This tracking takes place both in the camera view 210 and the virtual model 220. In the described technique, velocity prediction carried out by the content processing workstation 10 using the position of the players in the virtual model 220 is used to assist the tracking of each player in the camera view 210.

Steps S60 and S70 are repeated until all players have been processed as represented by the decision box S75. Thus, if not all players have been processed then processing proceeds to step S60 whereas if processing has finished then the processing terminates at S80.

As shown in FIG. 2, the method illustrated includes a further step S85, which may be required if images are produced by more than one camera. As such, the process steps S30 to S80 may be performed for the video images from each camera. As such, each of the players will be provided with a detection probability from each camera. Therefore, according to step S85, each of the player's positions is estimated in accordance with the probability for each player from each camera, and the position of the player estimated from the highest of the probabilities provided by each camera, so that the position with the highest probability for each player is identified as the location for that player.

If it has been determined that an error has occurred in the tracking of the players on the football pitch then the track for that player can be re-initialised in step S90. The detection of an error in tracking is produced where a probability of detection of a particular player is relatively low for a particular track and accordingly, the track is re-initialised.

A result of performing the method illustrated in FIG. 2 is to generate path data for each player, which provides a position of the player in each frame of the video image, which represents a path that that player takes throughout the match. Thus the path data provides position with respect to time.

Figure 4B:
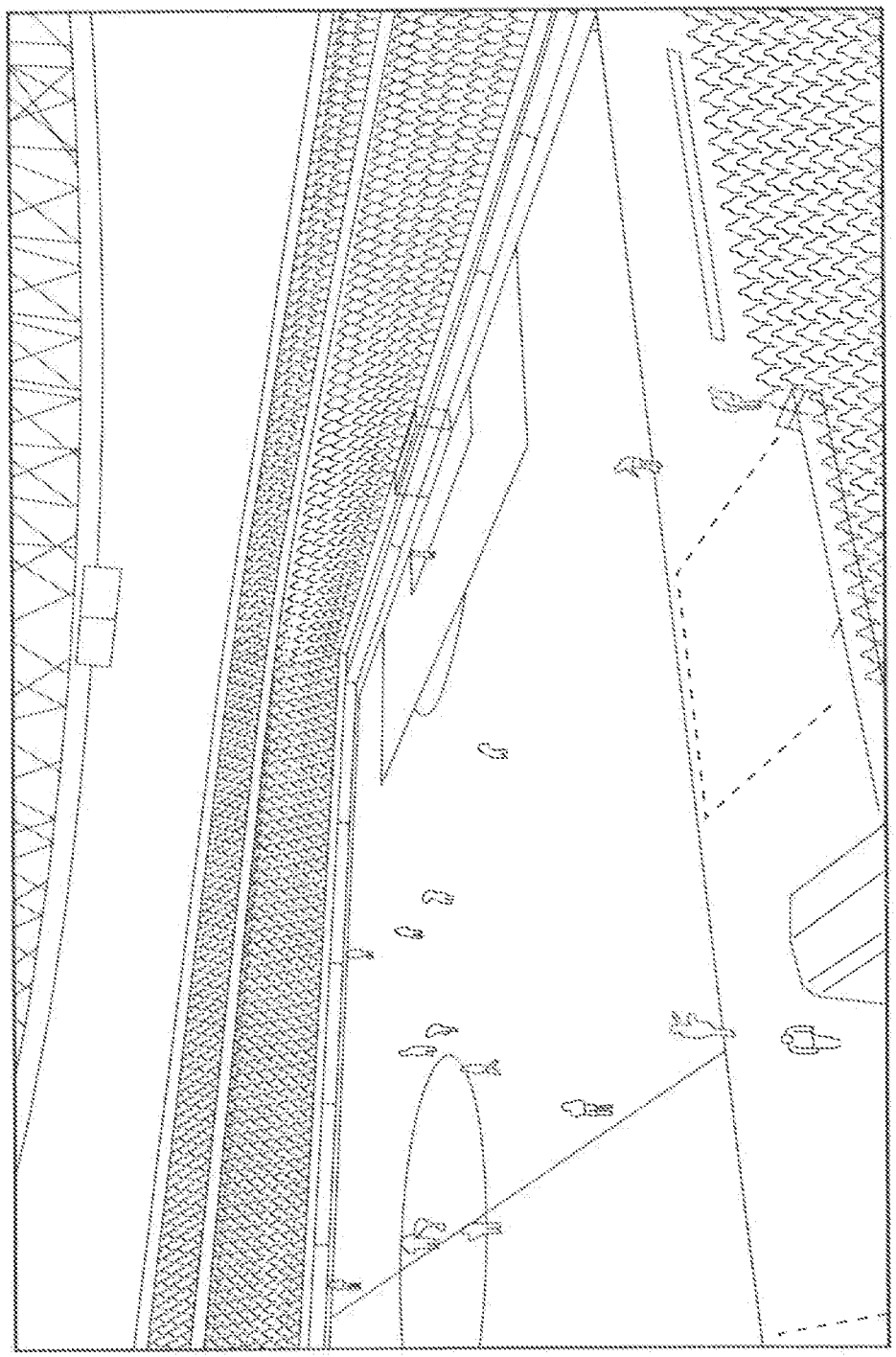
FIG. 4B is a line drawing that is equivalent to, and technically identical to, FIG. 4A.
Figure 5A:
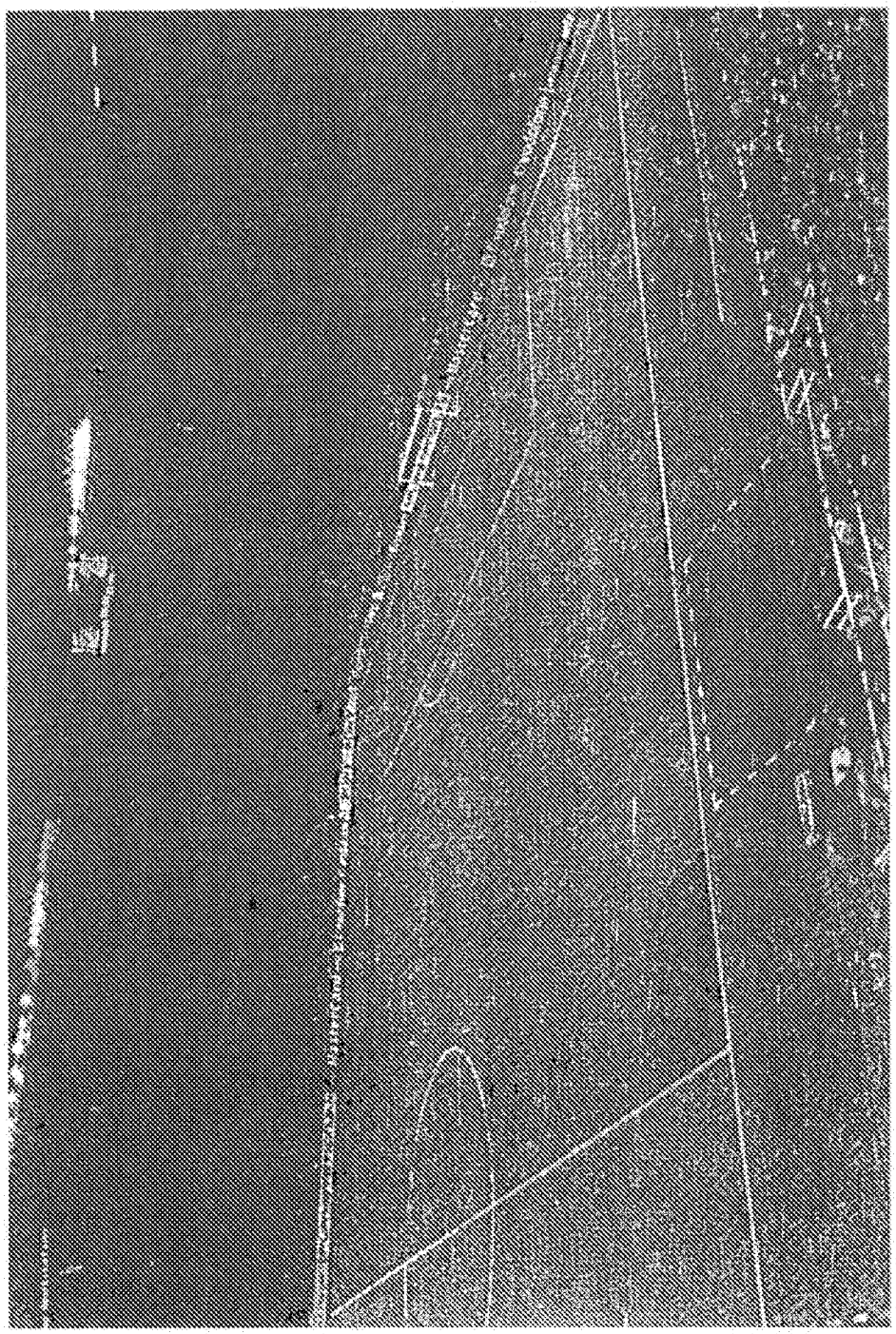
FIG. 5A is an illustration of a video image which has been processed in the object tracking system to produce a background model, by taking the mean
Figure 5B:
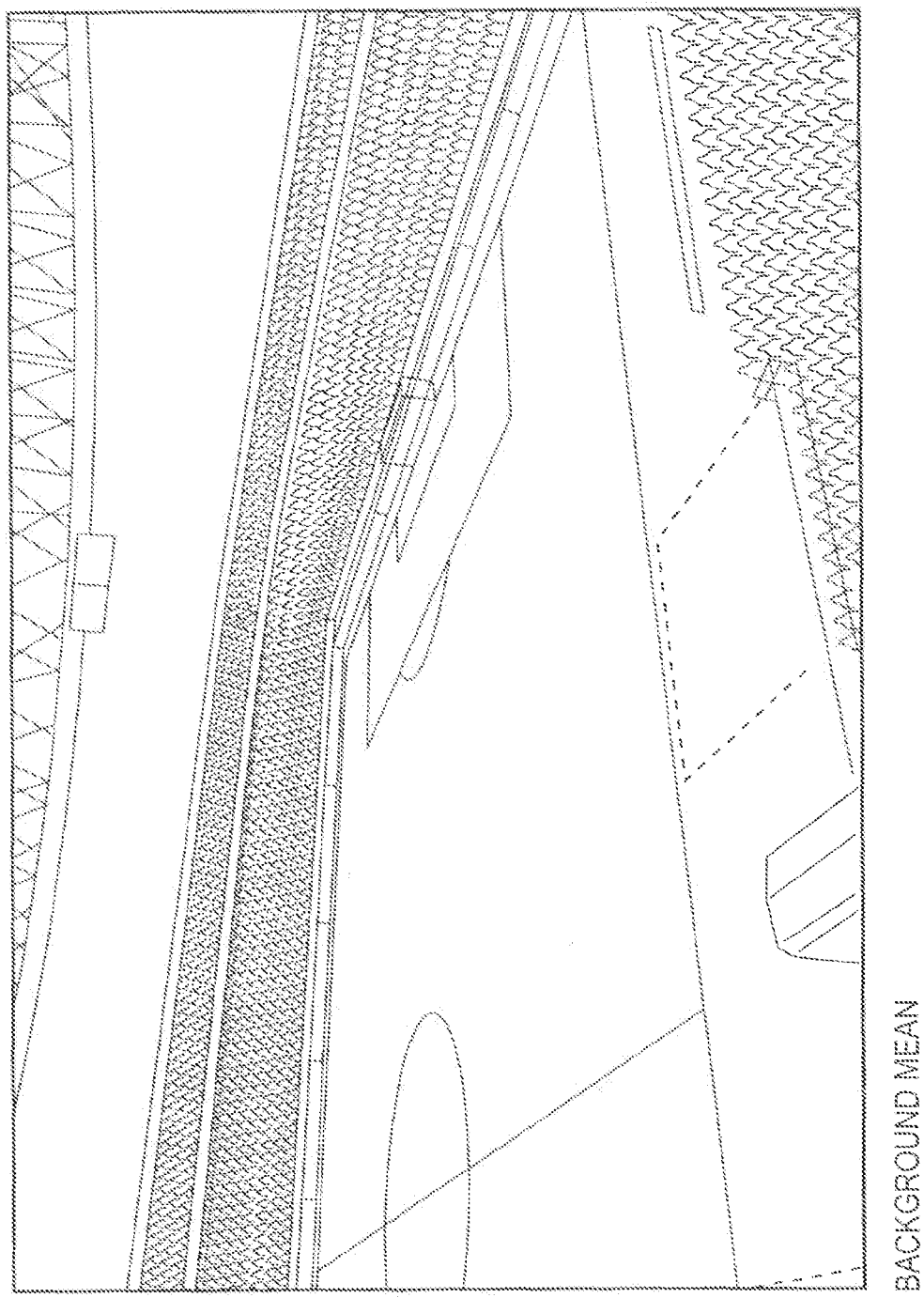
FIG. 5B is a line drawing that is equivalent to, and technically identical to, FIG. 5A
Figure 5C:
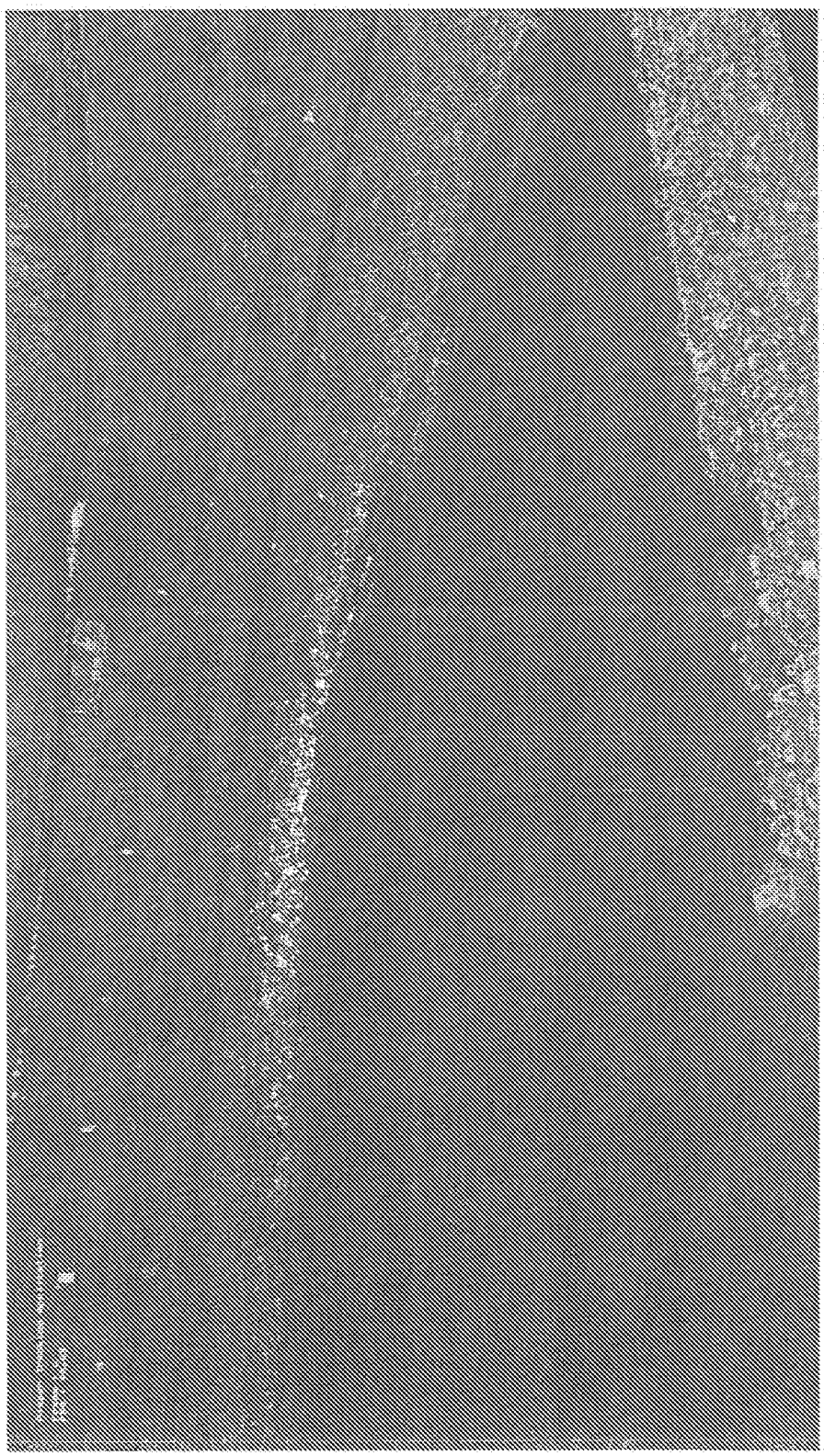
FIG. 5C shows the background model when considering the variance.
Figure 5D:
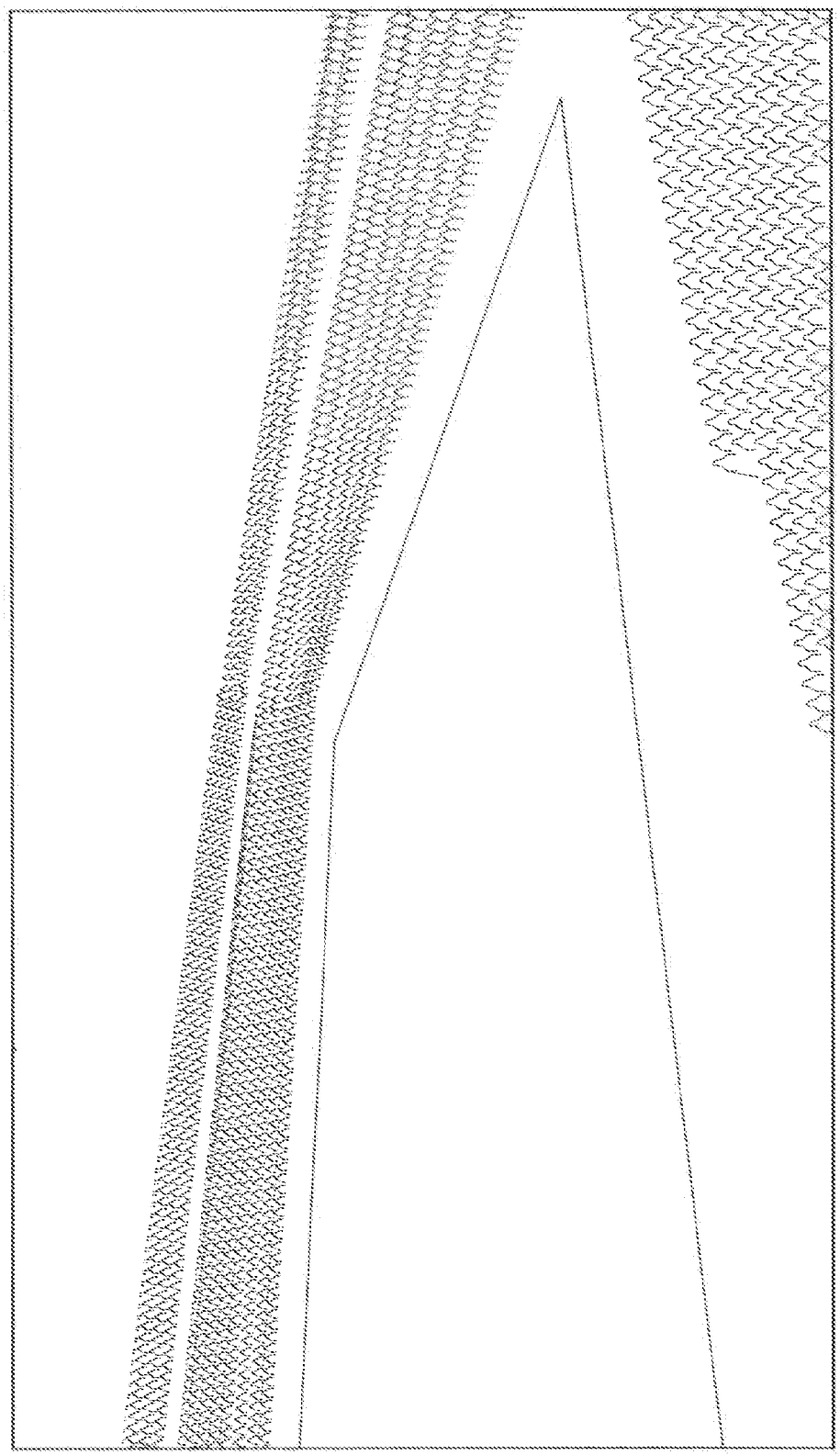
FIG. 5D is a line drawing that is equivalent to, and technically identical to, FIG. 5C
Figure 6A:
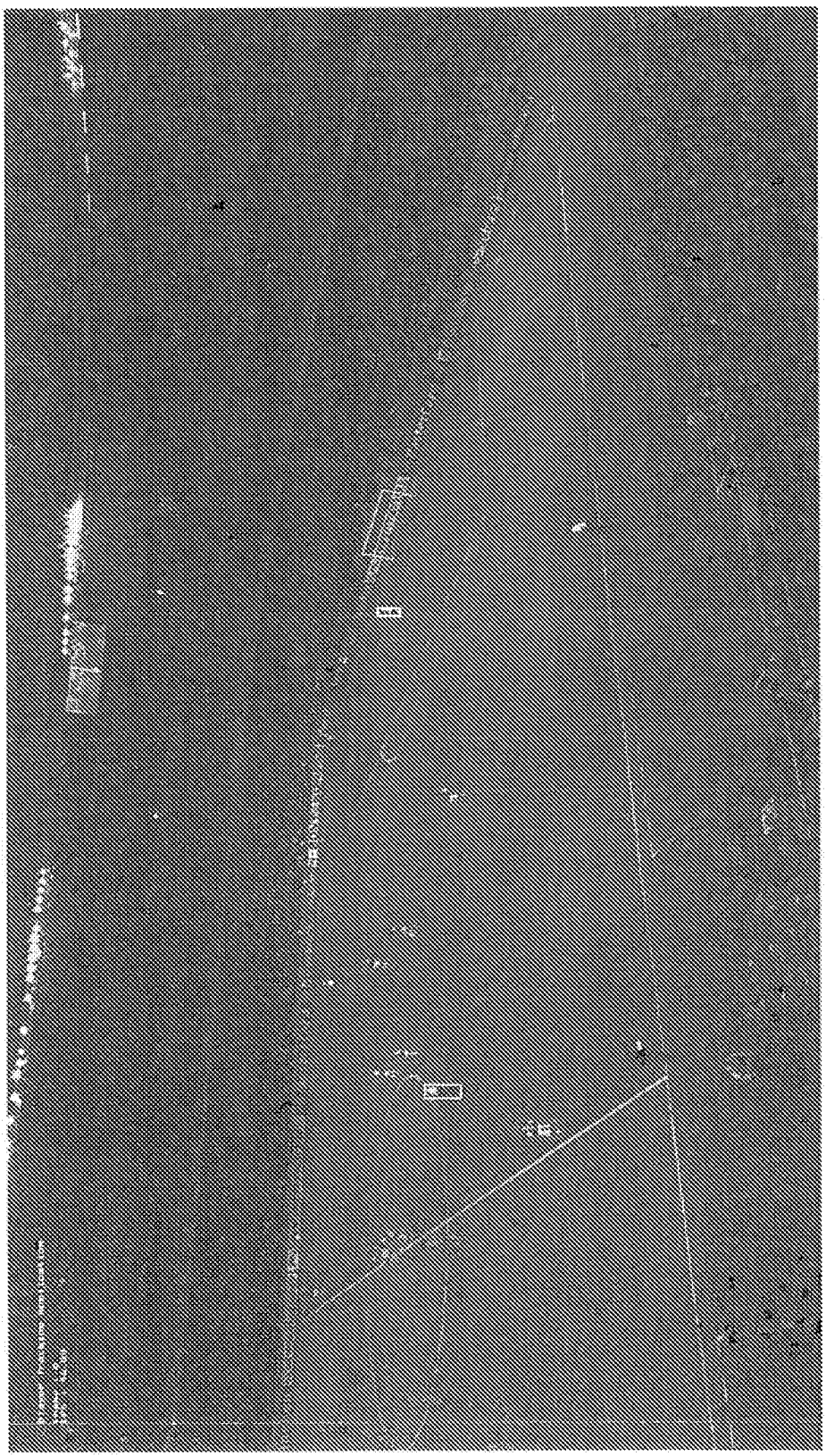
FIG. 6A is an illustration of a video image which has been processed in the object tracking system to show tracked positions of players.
Figure 6B:
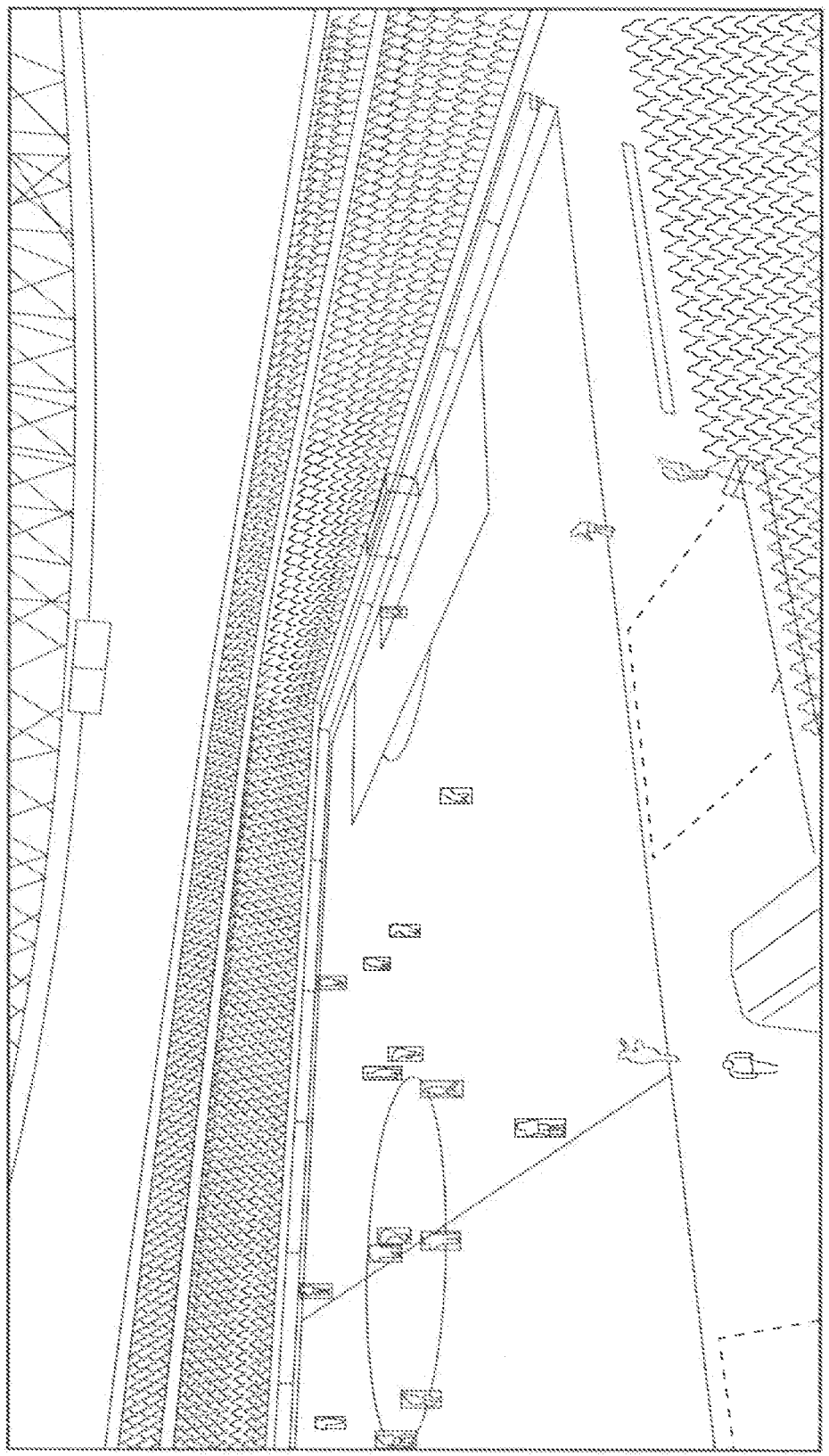
FIG. 6B is a line drawing that is equivalent to, and technically identical to, FIG. 6A

FIGS. 4A, 5A, 5C and 6A provide example illustrations of frames of example video images of a football match in which the present technique has been used to track players and produce a 3D model of the football match as a virtual model. In order to embellish the description and to aid understanding, line drawings corresponding to FIGS. 4A, 5A, 5C and 6A are provided in FIGS. 4B,5B,5D and 6B respectively. The line drawings are equivalent, and technically identical, to the illustrative frames. These have been included to assist the understanding if subsequent reproduction of the application renders the illustrations in FIGS. 4A, 5A, 5C and 6A unclear. FIG. 4A provides an example illustration of a video image produced by one HD camera of a football match. FIG. 5A provides an illustration of the video image of FIG. 4A in which the image has been processed to produce the background only using the mean value of each pixel, and FIG. 5C provides an illustration of the video image of FIG. 4A in which the image has been processed to produce the background only using the variance of each pixel in the image. In the corresponding line drawing of FIG. 5D, it will be apparent that the crowd produces most variance in the background (shown by dots in FIG. 5D). FIG. 6A provides an illustration of a result of the tracking which is to provide a bounded box around each player in correspondence with the example shown in FIG. 3A.

Figure 7A:
FIG. 7A is an illustration of two video images which have been captured from two different cameras, one for each side of the pitch and an illustration of a virtual representation of the football match in which the position of the players is tracked with respect to time.

FIG. 7A provides a corresponding illustration in which two cameras have been used (such as the cameras 22.1, 22.2) to generate video images each positioned respectively to view a different half of the pitch. In both the left half and the right half, the players are tracked as illustrated by the bounding boxes, which have been superimposed over each player.

Figure 7B:
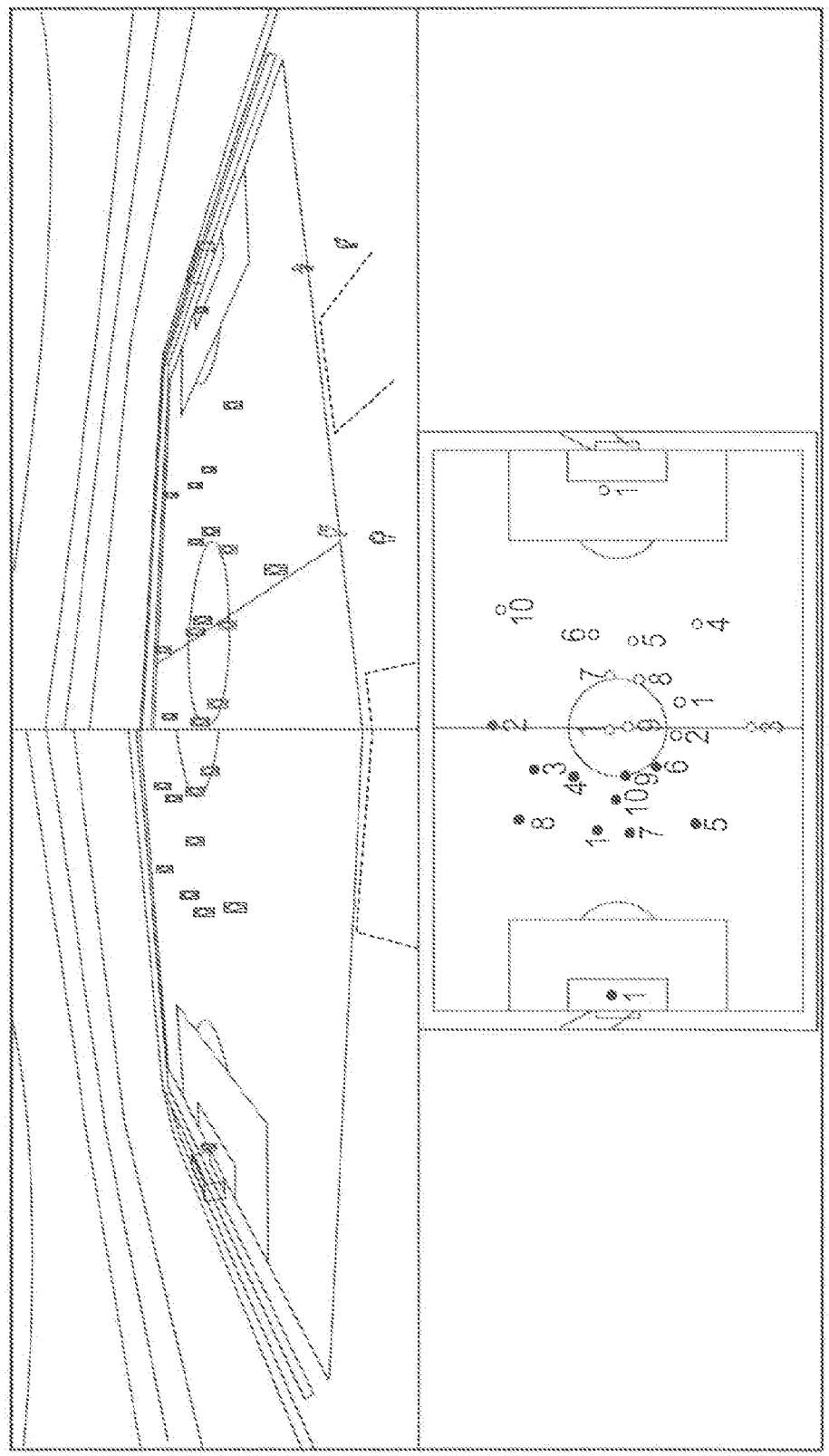
FIG. 7B is a line drawing that is equivalent to, and technically identical to, FIG. 7A.

In the lower half of FIG. 7A, a virtual model of the football match has been generated to represent the position of the players, as numbered in accordance with their position on the pitch as viewed by the cameras in the two dimensional video images in the upper half of FIG. 7A. Thus the 3D model view of the football match corresponds to the illustration of the virtual model shown in FIG. 3B. Again, in order to embellish the description and to aid understanding, a line drawing corresponding to FIG. 7A is provided in FIG. 7B. This line drawing is equivalent, and technically identical, to the illustrative frames and has been included to assist the understanding if subsequent reproduction of the application renders the illustrations in FIG. 7A unclear.

Figure 8:
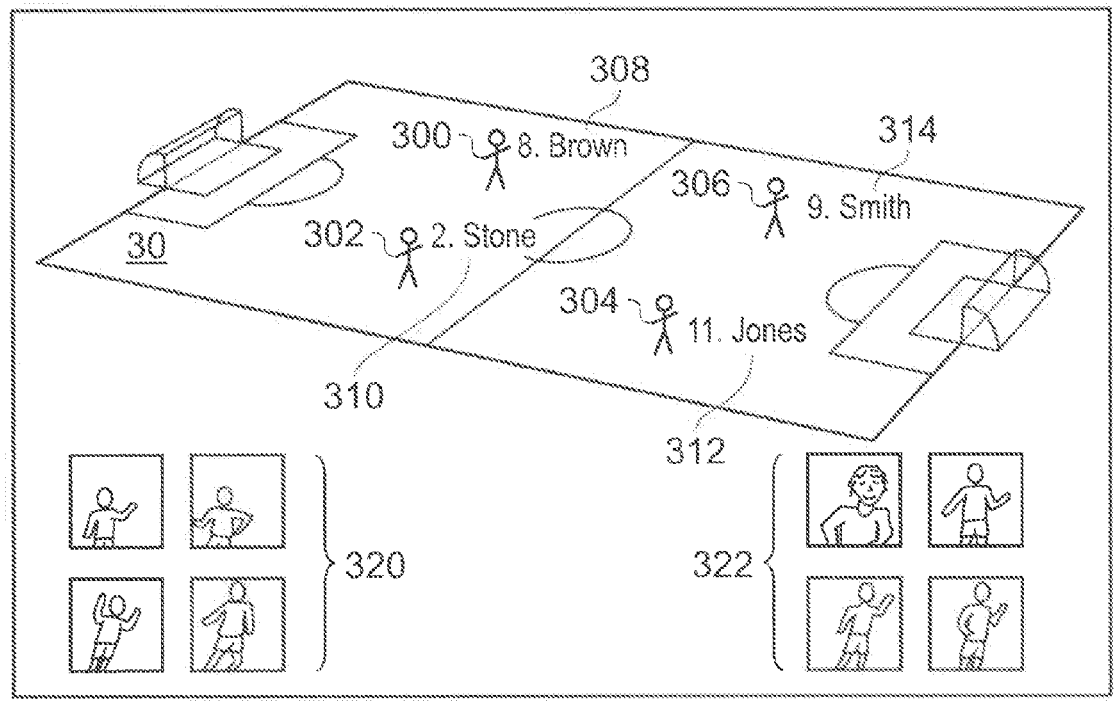
FIG. 8 is a representation of a video image of a football match in which the players which have been tracked are labelled.

According to the present technique tracking information, which is generated with respect to a 3D model of a 2D image of a football match as described above, can be added to the video images captured by a video camera. An example is illustrated in FIG. 8. As illustrated in FIG. 3B, the 3D model of the football pitch is used to assist in the tracking and detection of the players on that football pitch. Once the relative position of the players have been detected from the 3D model then a mask for that player is then projected onto the 2D image and used to assist in the detection and tracking of the players within the 2D image. However, once a player's position has been identified with a relatively high probability then the position of that player within the 2D video image of the camera is known. Accordingly, a graphic illustrating an identity of that player, as estimated by the tracking algorithm, can be overlaid on to the live video feed from the camera by the content processing workstation 10. Thus, as shown in FIG. 8, each of the players 300, 302, 304, 306 is provided with a corresponding label 308, 310, 312, 314 which is then used to follow that player around the pitch in order to track the identity of that player.

Also shown within an image view in FIG. 8 are two sets of extracted images 320, 322. Each of the sides on the football pitch is provided with one of the sets of extracted images 320, 322. Each image is an isolated section of the image provided from the camera 20, which aims as far as possible to isolate that player on the football pitch. Thus, having identified each of the players, then the image of that player within the video image can be extracted and displayed with other players within each of the sets corresponding to each of the teams on the football pitch. This presentation of the extracted images can provide an automatic isolation of a view of a particular player without a requirement for a separate camera to track that player throughout the football match. Thus, a single camera can be used to capture the entire football pitch, and each of the players can be tracked throughout the match as if the multiple cameras had been used to track each player. As a result, a significant reduction in expense and system complexity can be achieved.

As explained above, with reference to FIGS. 3A and 3B, the process of tracking each of the players utilises a 3D model of the football pitch in order to assist in the identification and location of the players. Having gathered information as to an estimation of the position of the players and tracked that information between each of the frames of the video images (object path data), it is possible to create a virtual representation of the live video images by synthesising images of each of the players and representing those players within the 3D model. Furthermore, a relative position of a view of the model or synthesised camera position within the virtual space can be adjusted using known techniques to adapt the relative view of the 3D model of the football pitch. Thus, for each of the positions of the players with respect to time as determined from the image view produced by the camera, it is possible to recreate a virtual 3D view of that live football match from a desired position of the camera.

Figure 9:
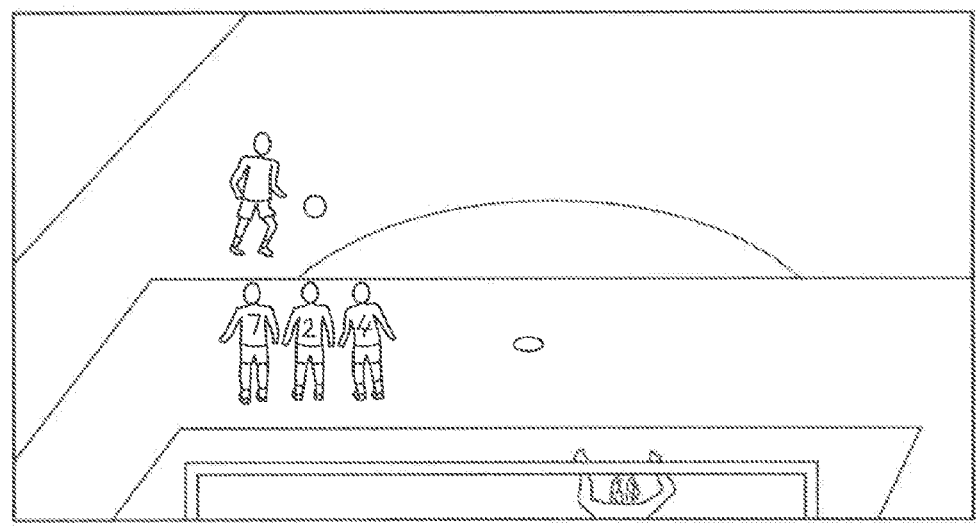
FIG. 9 is a three dimensional representation of a virtual model of a football match in which a view of the match can be changed.

As illustrated in an example shown in FIG. 9, a 3D model has been synthesised by applying the path data for each player to the 3D model (as illustrated in FIGS. 3B and 8) and the players have been represented by a model of each player at a position which changes with respect to time. Furthermore, since the view of the 3D model can be changed, a relative position of the camera can be altered in order to provide a view of the match at a position where in reality there is no camera present. Thus, as an example, if a free kick has been awarded, as shown in FIG. 9, the relative position of the camera can be provided from behind the goal in order to provide a view of the free kick at a position where in reality there is no camera present.

This is achieved as described above using the projection matrix P and mapping the relative position in 3D of the camera position from the corners of the pitch. Furthermore, having estimated a relative orientation of each player as described above, then this relative orientation can also be provided with the path data for each player, and the synthesised model of the player can be displayed with that orientation, which will change with respect to time. Thus, the orientation of the player which is identified as part of the tracking process described above is provided with the path data to generate the 3D model of the football match and this orientation data is used to change the orientation of the player in the model as this corresponds to the real image.

Figure 10:
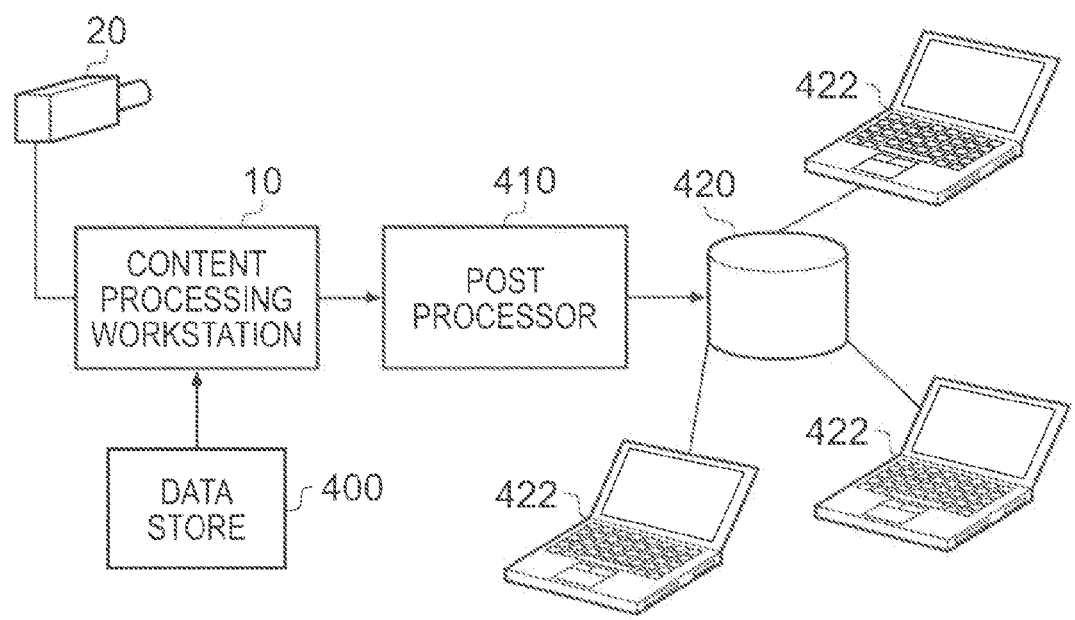
FIG. 10 is a schematic block diagram of a system for making a virtual model of the football match in which play is represented by synthesised elements available to client devices via an internet.

A further technique is illustrated in FIG. 10. As indicated above, it is possible to synthesise a 3D virtual model of a real football match by using the tracking information (object path data) generated using the tracking algorithm and applying synthesised representations of each of the players in combination with their relative orientation as indicated by the orientation lines in FIG. 3B in order to generate a representation of the actual live football match. In effect, therefore this represents a form of compression since the live video images are represented by a synthesised form in three dimensions by replacing the tracked position of the players on the football pitch with synthesised models. As such, a representation of the football match in accordance with a 3D virtual model can be streamed via the internet to client devices. Such an arrangement is shown in FIG. 10 where the content processing workstation 10 receives data from a data store 400, the data providing pre-generated synthesised representations of the football players. The representations could also include information pertaining to a posture, attitude or demeanour of each of the players in order to enhance the virtual representation of the football match. Thus the path data produced from the tracking process described above could be augmented to include information relating to a player's posture, attitude or demeanour and this information used to select a corresponding synthesised model of the player.

Having received the synthesised representations from the data store 400, the content processing workstation 10 can generate the 3D virtual representation of the football match and optionally pass the data representing the 3D virtual model to the post processing device 410. The post processor 410 could be used to package the information associated with the 3D virtual model of the football match for streaming to a distribution server 420.

In FIG. 10, each of the plurality of client processors 422 can request a particular view of the 3D virtual model of the football pitch by selecting options relating to a preferred team or a preferred view of a particular player, which are then fed to the distribution server 420. The distribution server 420 can then arranged to stream data representative of the 3D virtual model of the football match in accordance with the preferred options provided by the client terminals 422. The client terminals 422 can then reproduce their preferred view of the 3D virtual model providing effectively a compressed version of the live video images produced by the camera 20. Thus data for recreating a 3D model of the football match can be streamed to client devices, which provides a low bandwidth version of a live or near live football match. This data may simply include the object path data providing the tracking of the position of each player with respect to time, and may include the orientation of each player. The 3D model of the football pitch could be generated by the application software at the client terminals, which load synthesised models of the players and apply the path data to create the 3D model of the football match. Alternatively, the 3D model could be used to create a computer game, which replays or recreates a real match.

Embodiments of the present invention in which an event log comprising an association between a player and an event such as kicking the ball will now be described with reference to FIGS. 11 to 14. For the sake of clarity, it will be appreciated that objects to be tracked may not necessarily be players of a game but may be the referee, ball or other element of the game or indeed participants in an event such as equestrianism or motor racing. Therefore, the term player should be taken throughout to be synonymous with the term participant.

By generating an event log, data for recreating a 3D model of the football pitch as described above may be augmented with data relating to actions performed by the players thus improving the realism of the model. Furthermore, data stored in the event log can be used to generate match statistics and the like for post-match analysis and to assist in coaching the players. Typically, the event log is generated during post-match playback of video footage of the match, although in some embodiments, the event log can be generated substantially in real time as will be described later below.

Figure 11:
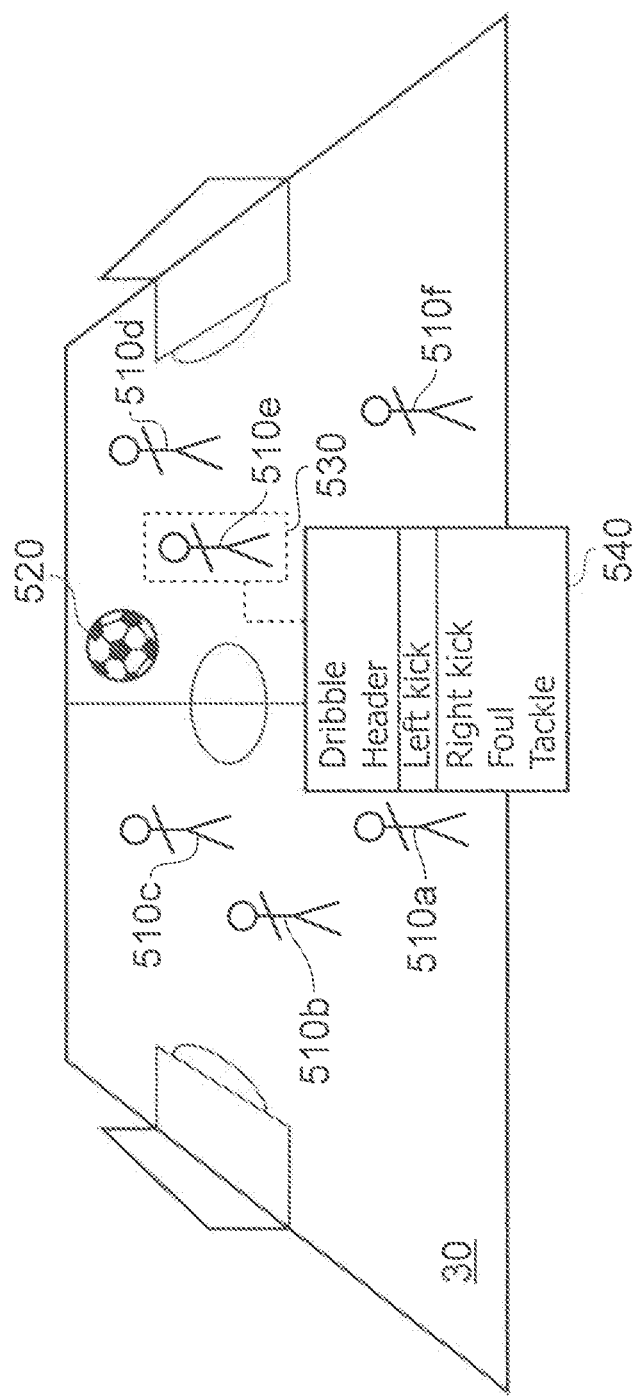
FIG. 11 is a schematic diagram of an image of a football pitch together with an event list which allows a game event to be associated with a player in accordance with an embodiment of the present invention.

FIG. 11 shows a schematic diagram of an image of a football pitch together with an event list which allows a game event to be associated with a player. In particular, FIG. 11 shows a plurality of players (510a, 510b, 510c, 510d, 510e and 510f) on the football pitch 30 together with a football 520. A player selection box 530 is shown around the player 510e. The player selection box 530 is associated with an event list which shows a list of possible events which can be associated with a player. For example, the event list 540 shows possible events such as "Dribble", "Header", "Left kick", "Right kick", "Foul", and "Tackle", although it will be appreciated that the event list can comprise any suitable event for association with a player.

In an embodiment, the event list 540 allows an operator to assign or associate an event to a player for a particular image frame or frames. A method by which this is achieved will now be described with reference to FIG. 12.

Figure 12:
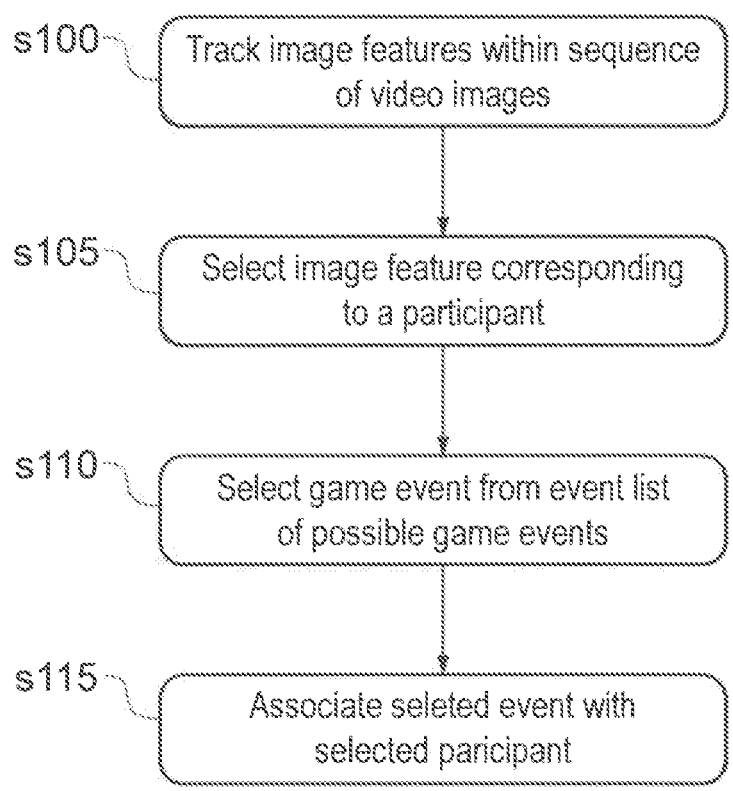
FIG. 12 is a flow diagram of a method of generating an event log in accordance with an embodiment of the present invention.

FIG. 12 is a flow diagram of a method of generating an event log in accordance with an embodiment of the present invention.

At a step s100, the content processing workstation 10 tracks, within a sequence of video images, image features corresponding to players as described above with reference to FIGS. 1 to 8. The sequence of video images can be sequentially displayed and played back to the operator using a suitable display so that events can be associated with players when particular events happen during a game. Events can be associated with a player either by a user manually associating or assigning an event to a player, by the content processing workstation 10 automatically detecting an event and associating the event with a player, or by a combination of the two techniques.

At a step s105, an image feature corresponding to a player (such as the player 510e) is selected. In an embodiment, the operator can select a player by clicking on the image feature corresponding to a player they wish to select (for example, player 510e) using a suitable user input device such as a mouse. However, it will be appreciated that other suitable input devices may be used to allow an operator to select an image feature corresponding to a player.

The content processing workstation 10 then designates that player as a selected player and causes the display to highlight the selected player (e.g. player 510e) by causing the display to display the player selection box 530 around the selected player. An operator can thus confirm visually that the player that they have clicked on has been designated as the selected player. However, the skilled person will of course realise that other suitable methods for highlighting the selected player could be used.

In one embodiment, to select a player, the operator may pause playback of the video images when they observe that a game event (such as a left or right footed kick) has occurred so that a player can be associated with that event. Alternatively, the content processing workstation 10 may detect the occurrence of a game event and pause the sequential display of the video images so that a user may assign or associate an event to a player. The way in which an occurrence of an event is detected will be described in more detail below with reference to FIG. 13.

In another embodiment, the content processing workstation 10 is operable to select, at the step s105, an image feature corresponding to a player in accordance with a detection of an occurrence of an event and a position of the ball 520 with respect to the players. This is described in more detail below with reference to FIG. 13.

Once a player has been selected at the step s105, a game event is selected from the event list 540 at a step s110. In the embodiment shown in FIG. 11, the content processing workstation 10 causes the event list 540 to be displayed in association with the player selection box 530. The operator can then select an appropriate event to be associated with the player from the event list 540. For example, the player 510e may have just kicked the ball 520 and so the operator would select "Left kick" from the event list 540 as shown by the grey highlight. So as to enable the operator to quickly select an appropriate event from the event list 540, the event list 540 may be displayed to be substantially adjacent to the player selection box 530, for instance on the video image, or the image feature corresponding to the player. This advantageously allows an increase in the speed at which footage of, for example, a football match may be annotated with event data because the operator will have the event list located close to the player 510e. However, it will be appreciated that the event list 540 could be displayed in any suitable manner.

In one embodiment, the content processing workstation 10 is operable to select the event from the event list 540 as will be described later below with reference to FIG. 13. In this case, the event list 540 need not be displayed. Alternatively, the event list 540 can be displayed so as to inform the operator that an event has been detected and which event is associated with which player. This provides the operator an opportunity to override the selection if they think that the content processing workstation 10 has incorrectly associated an event with a player or that the wrong event that has been associated with the player.

To achieve this, the operator can provide an appropriate input (for example by selecting a pause function from a graphical user interface) to the content processing workstation 10 so as to cause the event list 540 to be displayed such that the operator can select the player and appropriate event as described above.

Once a game event has been selected at the step s110 from the event list 540, the content processing workstation 10 associates the selected game event with the selected player so as to generate the event log. The event log comprises data relating to a time at which an event occurred, unique identifying data which uniquely identifies a player, an association between the player and the event, and the type of event. An example of the event log is shown below.

| Time | Player ID | Event type |
| --- | --- | --- |
| 00:10:35 | Player 1 | Left kick |
| 00:10:48 | Player 2 | Header |
| 00:11:05 | Player 1 | Right kick |
| 00:11:07 | Player 2 | Dribble |
| 00:11:26 | Player 3 | Tackle |

In the example shown above, the time is logged from the start of the match although it will be appreciated that any other suitable method of recording a time at which events occur may be used. Furthermore, it will be appreciated that the events need not be limited to the game events shown in the event list 540 and that other events such as "goal", "pass", "dive" or events appropriate to the sport or event with which the event list is associated may be used. Additionally, if an event is not listed in the event list 540, an operator can manually enter an event type using a suitable user interface such as a keyboard. However, this can slow down the annotation of match footage and so the event list 540 typically comprises game events which commonly occur during the football match.

An embodiment in which a game event is detected by the content processing workstation 10 will now be described with reference to FIG. 13.

Figure 13:
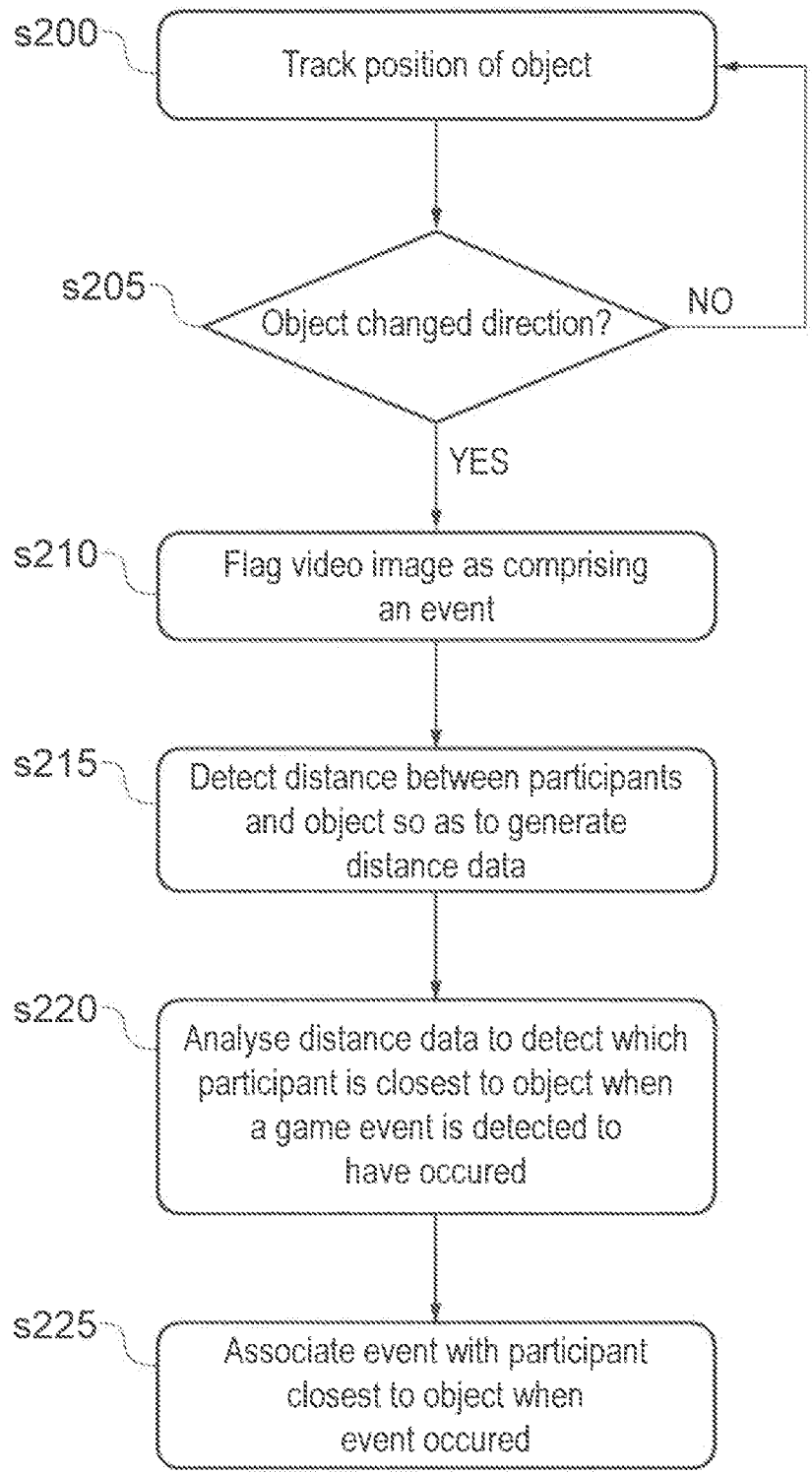
FIG. 13 is a flow diagram of a method of detecting a game event in accordance with an embodiment of the present invention.

FIG. 13 is a flow diagram of a method of detecting a game event in accordance with an embodiment of the present invention. The content processing workstation detects an occurrence of an event by tracking motion of the ball 520 and detecting when there is a change in direction of motion of the ball 520. For example, if the ball 520 is kicked by a player, the direction of motion of the ball 520 will, for example, change from travelling to the left to travelling to the right when viewed from the point of view of the camera 20.

Accordingly, the content processing workstation 10 is operable to track the ball 520 at a step s200 using a similar tracking process to that described above. The position of the ball is used to generate motion data and path data which relates to a path of the ball 520 with respect to time. To assist in the tracking of the ball 520, the content processing workstation 10 can also use video images captured by the camera 22.3 to triangulate the position of the ball 520 using known techniques. This is useful if the ball 520 is far away from the camera 20 thus meaning that a resolution of the camera 20 is unlikely to be sufficient to detect a size of the ball and hence allow distance from the ball 520 to the camera 20 to be calculated accurately. Therefore, in an embodiment, a stereoscopic pair of cameras such as the cameras 20 and 22.3 are used to detect the position of the ball 520 using known techniques. However, it will be appreciated that any other suitable number of cameras could be used so as to allow the content processing workstation 10 to detect the position of the ball 520.

At a step s 205, the content processing workstation 10 detects whether the ball 520 has changed direction by analysing the motion data for the ball. If no change in direction of motion of the ball is detected, then processing returns to the step s200 in which the position of the ball 520 is tracked. However, if the content processing workstation detects that the direction of motion of the ball 520 has changed, then processing proceeds to a step s210.

As described above, the tracking process generates motion vectors for the ball 520 which relate to a difference in position of the ball 520 between consecutive image frames. Therefore, in an embodiment of the present invention, the content processing workstation 10 is operable to detect a change in direction of motion of the ball 520 by plotting a graph of ball direction for each coordinate plane (for example: horizontal component x against vertical component y (xy plot); horizontal component x against depth component z (xz plot); and vertical component y against depth component z (yz plot)). However, it will be appreciated that other plots could be used and that other coordinate systems such as cylindrical polar coordinates and spherical polar coordinates as appropriate could be used to represent the motion vectors.

For the sake of clarity, it should be understood that the terms "plot" and "plotting" should not be taken to mean that the plots need also be displayed. In the present description, these terms refer to generating data values such that further data manipulation may be carried out on the plotted points as described below.

Figure 14:
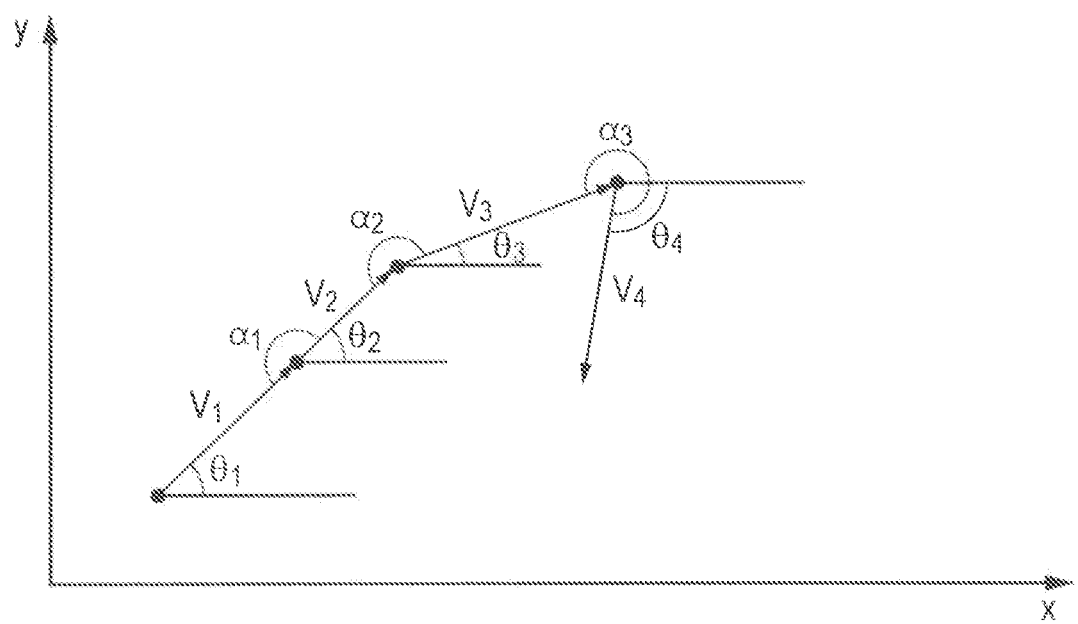
FIG. 14 is an xy plot of motion vectors used to detect a change in direction of motion of an object in accordance with an embodiment of the present invention.

An example xy plot of four motion vectors $v_1$, $v_2$, $v_3$, and $v_4$ is illustrated in FIG. 14. The content processing workstation 10 is operable to associate the generated motion vectors with each other so as to generate the path data. In the example shown in FIG. 14, the path data comprises the motion vectors $v_1$, $v_2$, $v_3$, and $v_4$. The content processing workstation 10 is operable to calculate an angle that each motion vector $v_1$, $v_2$, $v_3$, and $v_4$ makes with a line passing through the origin of the motion vector and parallel to the x-axis so as to generate angles θ1, θ2, θ3, and θ4. The angles θ1, θ2, θ3, and θ4 thus represent absolute angles with respect to a fixed reference.

The content processing workstation 10 then compares the angle to the x-axis for that motion vector with the angle associated with a previous motion vector. A change in direction of motion of the object corresponds to a difference in angle between one motion vector and a next motion vector. In other words, the direction of motion of the ball is analogous to the angle associated with the motion vector as illustrated in FIG. 14.

Those frames in which a change in the direction of motion of the ball 520 takes place are likely to comprise a game event. Therefore, video images which are detected as being associated with a change in the direction of motion of the ball 520 are detected and flagged by the content processing workstation 10 at the step s210 as comprising an event.

In the example shown in FIG. 14, the angle $\theta_1$ is the same as $\theta_2$. Therefore, no change in the direction of motion of the object between $v_1$ and $v_2$ is detected and consequently the frames associated with those motion vectors are unlikely to comprise an event. However, in the example shown in FIG. 14, $\theta_2$ is not the same as $\theta_3$ and therefore a change in the direction of motion between $v_2$ and $v_3$ will be detected by the workstation 10 and therefore the frames associated with motion vectors $v_2$ and $b_3$ are likely to comprise an event.

In some embodiments, each frame in which there is detected to be a change in the direction of motion of the ball 520 is flagged as comprising an event. However, if the change in direction is relatively small (for example between $v_2$ and $v_3$), it may be that the ball 520 was merely deflected off a player or swerved or curled in flight. Therefore, in some embodiments, the content processing workstation 10 only detects an event if the change in direction of motion of the ball 520 (i.e. the angle between the motion vector and the x-axis) is greater than a predetermined threshold. Optionally, an event is detected if there is a change in sign of the absolute angle that the motion vector makes with the reference.

This is illustrated in FIG. 14 by the motion vectors $v_3$ and $v_4$. In this example, the negative angle $\theta_4$ is greater than the positive angle $\theta_3$ (where positive is taken to be anti clockwise from the x-axis and negative is taken to be clockwise from the x-axis) as well as having a different sign. Therefore, the video images associated with the motion vectors $v_3$ and $v_4$ will be detected by the workstation 10 as comprising event. The workstation 10 then flags those video images as comprising an event.

The plotting process and detection of angles described above is carried out in respect of each plot (xy, xz, and yz). The workstation detects an event as described above whenever there is a change in direction of motion of the ball 520 as indicated in any one of the three plots. Alternatively, an event is only said to have taken if there is a correlation between the plots, for example a change in direction of motion as indicated in both the xy plot and the xz plot.

It will be appreciated that any suitable number and types of plot could be used so as to detect a change in the direction of motion of the ball 520. Additionally, it will be appreciated that the angle calculated for each motion vector need not be an absolute value but could be a relative angle with respect to a previous motion vector as illustrated by the angles $\alpha_1, \alpha_2$, and $\alpha_3$ in FIG. 14. Therefore, in this example, a change in direction corresponds to a relative angle between two consecutive motion vectors not being equal to 180°.

Returning now to FIG. 13, in an embodiment, the content processing apparatus is also operable to automatically associate a detected game event with a player. This technique relies on the fact that a player who is kicking or heading the ball (i.e. involved in an event) is likely to be the closest player to the ball and therefore that player should be associated with that event.

To achieve this, once those video images which are detected as comprising events have been flagged, the content processing workstation 10 is operable to detect, at a step s215, a relative distance between the ball 520 and each of the players so as to generate distance data comprising distance values for each player which relate to the distance between the ball 520 and the respective players. Typically, this is only done for those video images or frames which are flagged as comprising an event so as to reduce processing resources. However, the distance between the players and the ball 520 can also be calculated for each video image so as to generate a distance log of the distance between the players and the ball 520 for each frame or image.

Then, at a step s220, the workstation 10 analyses the distance data to detect which of the players was closest to the ball 520 when the game event was detected at the steps s205 and s210 to have occurred. Typically, the data is analysed to detect the lowest distance value and this value is selected by the workstation as corresponding to the closest player, although it will be appreciated that other suitable techniques could be used.

At a step s225, the content processing workstation 10 associates the game event for that frame with the player associated with the lowest distance value. The association may then be stored in the event log as described above.

In some embodiments, the content processing workstation 10 can also detect the type of event by detecting the relative position of the ball 520 with respect to a player's body. For example, a change of ball direction near a player's head is likely to correspond to a header, whilst a change of ball direction near a player's feet is likely to correspond to a kick. Therefore, the workstation 10 analyses the video images captured by, for example the cameras 20 and 22.3, so as to detect a relative height of the ball 520 with respect to the pitch 30 and/or a player who is detected as being closest to the ball when the event occurs (as described above with reference to steps s215 to s225) using known techniques such as triangulation. Typically, the correspondence between the relative height of the ball 520 with respect to the player and the event associated with that height is stored in a look up table. Therefore, the workstation selects an appropriate game event from the event list 540 in accordance with the detected position of the ball 520 with respect to the player and the data stored in the look up table.

Accordingly, game events may be associated with players substantially in real-time without input by an operator which may cause unnecessary delays in annotating the footage.

In other embodiments, when the sequence of video images are presented to the operator for annotation, the content processing workstation 10 can pause playback of the video images at those video images which are flagged as comprising an occurrence of a game event. The workstation 10 then causes the event list to be displayed together with the image feature corresponding to the player which has been detected as being associated with that event and/or the player selection box 530. The operator may then select an appropriate event from the event list 540 as described above. Again, this can improve the speed at which footage can be marked up because the operator does not need to review all the footage but merely mark up those frames which are flagged by the content processing workstation 10.

Additionally, where the content processing workstation 10 has automatically associated a particular type of event with a particular player, the workstation 10 can pause playback of the video images so that the operator can verify that the type of event has been correctly associated with that player. If it has not, then the operator can select the correct player by, for example, clicking on an image feature corresponding to that player and selecting the correct game event from the event list 540 as described above.

It will be appreciated that the above technique for automatically detecting an event, type of event and associating that event with a player is generally limited to events in which a player makes contact with the ball such as a tackle, header, kick and the like. However, other game events such as a foul or a dive may not necessarily involve the ball 520. Therefore, the above techniques for manual selection of event and automatic detection and/or selection of event may be combined as appropriate. Furthermore, it will be appreciated that if the event list 540 does not comprise the desired event, then the operator may input the type of event using a suitable input device such as a keyboard in cooperation with a suitable graphical user interface such as a dialogue box. Additionally, it will be realised that the steps illustrated in FIG. 13 need not necessarily be performed sequentially and that, for example, steps s215 to s225 could be performed in parallel with steps s200 to s210.

Other techniques of tracking the ball 520 may also be used so as to allow the operator to tag points at which the ball makes contact with the pitch 30 and, assuming there is no spin, wind or other more subtle motions which may affect the ball, marking the apex of a parabola which the ball 520 follows whist in the air. This data may then be used a path data for the ball and also be associated with data in the event log so as to assist in 3D modelling of the match.

As will be appreciated, various modifications may be made to the embodiments described above without departing from the scope of the present invention as defined in the appended claims. For example, although the example embodiments have been illustrated with reference to a football match, it will be appreciated that any other sporting event or entertainment event such as theatre could be viewed to apply the techniques disclosed above. Furthermore, other processors other than the Cell processor could be used to perform the technique. Processes according to the present technique, may be implemented in the form of a computer program product comprising processor-implementable instructions stored on a data carrier such as a floppy disk, optical disk, hard disk, PROM, RAM, flash memory or any combination of these or other storage media, or transmitted via data signals on a network such as an Ethernet, a wireless network, the internet, or any combination of these or other networks.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of generating an event log of game events associated with a physical object present in a sporting event, implemented on an apparatus, the method comprising:
   tracking, within a sequence of video images, image features which correspond to respective physical objects in the sporting event;
   displaying, on a display unit, the sequence of video images containing the tracked image features;
   detecting occurrence of a game event indicated by a detected change in direction of motion of a game object, which is different from the physical objects, by analyzing motion data of the game object from the sequence of video images;
   selecting, from the tracked image features, a first image feature displayed which corresponds to one of the physical objects to designate that physical object as a selected physical object, the first image feature being highlighted upon selection;
   displaying, responsive to detection of occurrence of the game event, a predefined event list of possible game events adjacent to the highlighted selected first image feature and superimposed over the displayed sequence of video images;
   selecting a game event from the displayed predefined event list of possible game events for association with the selected physical object in accordance with a manual selection of the game event by a user; and
   associating the selected game event with the selected physical object to generate the event log for that physical object.

2. The method according to claim 1, further comprising:
   tracking, by analysis of the sequence of video images, a position within each video image of the game object associated with the sporting event to generate the motion data which relates to the direction of motion of the game object within the sequence of video images; and
   flagging an associated video image of the sequence of video images in which the game event is detected to have occurred to indicate that the associated image includes the occurrence of the game event.

3. The method according to claim 1, wherein the game event is detected to have occurred when the detected change in the direction of motion of the game object is greater than a predetermined threshold.

4. The method according to claim 1, further comprising:
   detecting, by analysis of the sequence of video images, a position of the game object with respect to the selected physical object; and
   selecting the game event from the predefined event list based on the detected position of the game object with respect to the selected physical object.

5. The method according to claim 1, further comprising:
   detecting a relative distance between the game object and each of the physical objects to generate distance data which relates to the respective distances between the game object and each of the physical objects;
   analyzing the distance data to determine which of the physical objects was closest to the game object when the game event is detected to have occurred; and
   associating the detected game event with the physical object that is determined to be closest to the game object when the detected game event occurred.

6. The method according to claim 2, further comprising:
   sequentially displaying the sequence of video images; and
   pausing the sequential display of the sequence of video images at the associated video image which has been flagged as including the occurrence of the game event.

7. The method according to claim 1, wherein each physical object is associated with unique identifying data which allows that physical object to be uniquely identified.

8. A non-transitory computer-readable storage medium having stored thereon instructions which, when executed by a computer, cause the computer to perform a method of generating an event log of game events associated with a physical object present in a sporting event, the method comprising:

tracking, within a sequence of video images, image features which correspond to respective physical objects in the sporting event;

displaying, on a display unit, the sequence of video images containing the tracked image features;

detecting occurrence of a game event indicated by a detected change in direction of motion of a game object, which is different from the physical objects, by analyzing motion data of the game object from the sequence of video images;

selecting, from the tracked image features, a first image feature displayed which corresponds to one of the physical objects to designate that physical object as a selected physical object, the first image feature being highlighted upon selection;

displaying, responsive to detection of occurrence of the game event, a predefined event list of possible game events adjacent to the highlighted selected first image feature and superimposed over the displayed sequence of video images;

selecting a game event from the displayed predefined event list of possible game events for association with the selected physical object in accordance with a manual selection of the game event by a user; and associating the selected game event with the selected physical object to generate the event log for that physical object.

9. An apparatus for generating an event log of game events associated with a physical object in a sporting event, the apparatus comprising:

a tracking device that tracks, within a sequence of video images, image features which correspond to respective physical objects in the sporting event;

a displaying device that displays the sequence of video images containing the tracked image features;

a detector that detects occurrence of a game event indicated by a detected change in direction of motion of a game object, which is different from the physical objects, by analyzing motion data of the game object from the sequence of video images;

an image feature selector that selects, from the tracked image features, a first image feature displayed which corresponds to one of the physical objects to designate that physical object as a selected physical object, the first image feature being highlighted upon selection;

a game event selector that selects a game event from a displayed predefined event list of possible game events for association with the selected physical object in accordance with a manual selection of the game event by a user; and an association device that associates the selected game event with the selected physical object to generate the event log for that physical object, wherein, responsive to detection of occurrence of the game event, the predefined event list of possible game events is displayed on the displaying device adjacent to the highlighted selected first image feature and superimposed over the displayed sequence of video images.

10. The apparatus according to claim 9, wherein:

the tracking device is operable to track, by analysis of the sequence of video images, a position within each video image of the game object associated with the sporting event to generate the motion data which relates to the direction of motion of the game object within the sequence of video images; and the apparatus further comprises:

a flagging device that flags an associated video image of the sequence of video images in which the game event is detected to have occurred to indicate that the associated video image includes the occurrence of the game event.

11. The apparatus according to claim 9, wherein the game event is detected to have occurred when the detected change in the direction of motion of the game object is greater than a predetermined threshold.

12. The apparatus according to claim 9, wherein:

the tracking device is operable to detect, by analysis of the sequence of video images, a position of the game object with respect to the selected physical object; and the game event selector is operable to select the game event from the predefined event list based on the detected position of the game object with respect to the selected physical object.

13. The apparatus according to claim 9, wherein:

the tracking device is operable to:

detect a relative distance between the game object and each of the physical objects to generate distance data which relates to the respective distances between the game object and each of the physical objects; and analyze the distance data to detect which of the physical objects was closest to the game object when the game event is detected to have occurred; and the association device is operable to associate the detected game event with the physical object that is determined to be closest to the game object when the detected game event occurred.

14. The apparatus according to claim 10, further comprising:

a display that sequentially displays the sequence of video images;

wherein the apparatus is further configured to:

pause the sequential display of the sequence of video images at the associated video image which has been flagged as including the occurrence of the game event.

15. The apparatus according to claim 9, wherein each physical object is associated with unique identifying data which allows that physical object to be uniquely identified.

16. A graphical user interface for generating an event log of game events associated with physical objects in a sporting event, the event being subsequently associated with the physical object, the interface comprising:

tracking circuitry that tracks image features, within one frame of a sequence of frames, which correspond to respective physical objects in the sporting event;

a display component that displays the sequence of video images containing the tracked image features;

a detector that detects occurrence of a game event indicated by a detected change in direction of motion of a game object, which is different from the physical objects, by analyzing motion data of the game object from the sequence of video images;

an image feature selector that selects, from the displayed image features, a first image feature which corresponds to one of the physical objects to designate that physical object as a selected physical object, the first feature being highlighted upon selection; and a game event selector that selects a game event from a displayed predefined event list of possible game events for association with the selected physical object in accordance with a manual selection of the game event by a user;

wherein, responsive to detection of occurrence of the game event, the predefined event list of possible game events is displayed on the displaying device adjacent to the highlighted selected first image feature and superimposed over the displayed sequence of video images.

17. An apparatus for generating an event log of game events associated with a physical object in a sporting event, the apparatus comprising:
- means for tracking, within a sequence of video images, image features which correspond to respective physical objects in the sporting event;
- means for displaying the sequence of video images containing the tracked image features;
- means for detecting occurrence of a game event indicated by a detected change in direction of motion of a game object, which is different from the physical objects, by analyzing motion data of the game object from the sequence of video images;
- means for selecting, from the tracked image features, a first image feature displayed which corresponds to one of the physical objects to designate that physical object as a selected physical object, the first feature being highlighted upon selection;
- means for selecting a game event from a displayed predefined event list of possible game events for association with the selected physical object in accordance with a manual selection of the game event by a user; and
- means for associating the selected game event with the selected physical object to generate the event log for that physical object, wherein, responsive to detection of occurrence of the game event, the predefined event list of possible game events is displayed on the means for displaying adjacent to the highlighted selected first image feature and superimposed over the displayed sequence of video images.

18. The method according to claim 1, wherein the physical objects are players and the game object is a ball.

19. The method according to claim 1, wherein said selecting the first image feature to designate that physical object as the selected physical object is performed before said detecting the occurrence of the game event.

20. The method according to claim 1, wherein said displaying the predefined event list includes pausing the sequence of video images.

* * * * *